US011479071B2

(12) United States Patent
Azuma et al.

(10) Patent No.: US 11,479,071 B2
(45) Date of Patent: Oct. 25, 2022

(54) WORK VEHICLE AND FRONT GRILL OF WORK VEHICLE

(71) Applicant: Kubota Corporation, Osaka (JP)

(72) Inventors: Masahiro Azuma, Sakai (JP); Tatsuya Nagatomi, Sakai (JP); Kenta Moribe, Sakai (JP); Tomonori Kaneko, Sakai (JP)

(73) Assignee: Kubota Corporation, Osaka (JP)

( * ) Notice: Subject to any disclaimer, the term of this patent is extended or adjusted under 35 U.S.C. 154(b) by 219 days.

(21) Appl. No.: 16/708,745

(22) Filed: Dec. 10, 2019

(65) Prior Publication Data

US 2020/0276872 A1 Sep. 3, 2020

(30) Foreign Application Priority Data

Mar. 1, 2019 (JP) .............................. JP2019-037413
Mar. 27, 2019 (JP) .............................. JP2019-060508
Mar. 27, 2019 (JP) .............................. JP2019-060509

(51) Int. Cl.
*B60G 3/20* (2006.01)
*B60G 15/06* (2006.01)
(Continued)

(52) U.S. Cl.
CPC .............. *B60G 3/20* (2013.01); *B60G 15/062* (2013.01); *B60K 11/08* (2013.01); *F01N 13/102* (2013.01);
(Continued)

(58) Field of Classification Search
CPC . B60G 3/20; B60G 3/207; B60G 3/18; B60G 3/185; B60G 7/04; B60G 15/062; B60G 2300/13
See application file for complete search history.

(56) References Cited

U.S. PATENT DOCUMENTS 2,052,309 A * 8/1936 Kovach .................. B60G 3/185
267/250
2,096,118 A * 10/1937 Leighton .................. B60G 3/20
267/222
(Continued)

FOREIGN PATENT DOCUMENTS

JP       S59102932 A    6/1984
JP       4135859 U     12/1992
(Continued)

*Primary Examiner* — Frank B Vanaman
(74) *Attorney, Agent, or Firm* — The Webb Law Firm

(57) ABSTRACT

A work vehicle includes: a wheel support member configured to support a pair of left and right traveling wheels; a link mechanism configured to support the wheel support member such that the wheel support member can be raised and lowered, the link mechanism being provided spanning between a vehicle body and the wheel support member; a suspension mechanism configured to elastically support the wheel support member, the suspension mechanism being provided spanning between a suspension support portion, which is formed on the vehicle body, and the wheel support member; and a lateral link configured to restrict leftward and rightward movement of the wheel support member, the lateral link being joined to a vehicle body-side support portion, which is formed on the vehicle body, and to a wheel-side support portion, which is formed on the wheel support member, wherein the link mechanism has: an upper link with an front end portion supported so as to be able to pivot up and down around an upper pivot axis by a link support portion, which is formed on the vehicle body, and with a rear end portion joined so as to be able to relatively pivot around an upper joint axis by the wheel support member; and a lower link with a front end portion supported so as to be able to pivot up and down around a lower pivot axis by the link support portion, and with a rear end portion joined to the wheel support member so as to be able to relatively pivot around a lower joint axis, a distance between the upper pivot axis and the upper joint axis is set shorter than a distance between the lower pivot axis and the lower joint axis, a gap width between the upper joint axis and the lower joint axis is set larger than a gap width between the upper pivot axis and the lower pivot axis, and when the vehicle body is in an unloaded state, the lower joint axis is located lower than the lower pivot axis.

4 Claims, 20 Drawing Sheets

(51) Int. Cl.
  *F01N 13/10* (2010.01)
  *B60K 11/08* (2006.01)
(52) U.S. Cl.
  CPC .... *B60G 2200/144* (2013.01); *B60G 2202/12* (2013.01); *B60G 2202/20* (2013.01); *B60G 2202/312* (2013.01); *B60G 2204/4102* (2013.01)

(56) References Cited

U.S. PATENT DOCUMENTS

| | | | | |
|---|---|---|---|---|
| 2,164,470 A | * | 7/1939 | Opolo | B62D 7/10 |
| | | | | 280/124.153 |
| 2,322,890 A | * | 6/1943 | Slack | B60G 15/062 |
| | | | | 280/124.179 |
| 2,955,842 A | * | 10/1960 | Stump | B60G 9/00 |
| | | | | 280/124.109 |
| 4,273,356 A | * | 6/1981 | Sakata | B60G 3/20 |
| | | | | 280/124.144 |
| 5,022,673 A | * | 6/1991 | Sekino | B60G 3/20 |
| | | | | 280/124.138 |
| 5,104,142 A | * | 4/1992 | Tsubota | B60G 3/20 |
| | | | | 280/124.109 |
| 6,073,946 A | * | 6/2000 | Richardson | B60G 11/28 |
| | | | | 280/124.128 |
| 7,837,203 B1 | * | 11/2010 | Schmidt | B60G 3/185 |
| | | | | 280/6.152 |
| 8,998,260 B2 | * | 4/2015 | Kausch | B62D 21/11 |
| | | | | 280/788 |
| 2012/0055729 A1 | | 3/2012 | Bessho et al. | |

FOREIGN PATENT DOCUMENTS

| | | |
|---|---|---|
| JP | 8156551 A | 6/1996 |
| JP | 2002068018 A | 3/2002 |
| JP | 201251506 A | 3/2012 |

* cited by examiner

WORK VEHICLE AND FRONT GRILL OF WORK VEHICLE

CROSS-REFERENCE TO RELATED APPLICATIONS

This application claims priority to Japanese Patent Application No. 2019-037413 filed Mar. 2, 2019, and Nos. 2019-060508 and 2019-060509 filed Mar. 27, 2019, the disclosures of which are hereby incorporated by reference in their entirety.

BACKGROUND OF THE INVENTION

1. Field of the Invention

The present invention relates to a work vehicle.

Also, the present invention relates to a work vehicle in which an exhaust manifold cover that covers the upper side of an exhaust manifold, which is continuous with cylinders in an engine body, is provided adjacent to the engine body.

The present invention relates to a front grill with a structure in which a large number of bridge members, which intersect each other in a front view thereof, are provided, and a large number of recessed portions, which are recessed toward the back side, are formed in portions surrounded by the bridge members.

2. Description of the Related Art

[Background Art 1]

There are work vehicles that include wheel support members that support pairs of left and right traveling wheels, link mechanisms that span between vehicle bodies and the wheel support members and support the wheel support members such that the wheel support members can be raised and lowered, suspension mechanisms that span between suspension support portions formed in the vehicle bodies and the wheel support members and elastically support the wheel support members, and lateral links that are joined to vehicle body-side support portions formed on the vehicle bodies and wheel-side support portions formed in the wheel support members and restrict leftward and rightward movement of the wheel support members.

Examples of this kind of work vehicle include a work vehicle described in JP 2012-51506A. This work vehicle includes a pair of left and right auxiliary frames and a rear wheel axle case, each of which serves as a wheel support member, an upper arm and a lower arm, each of which serves as a link mechanism, a suspension unit, which serves as a suspension mechanism, and a lateral rod, which serves as a lateral link.

[Background Art 2]

A technique described in [1] below is known as a technique in which an exhaust manifold cover for covering the upper side of an exhaust manifold is provided adjacent to an engine body as mentioned above.

[1] A sound insulation cover, which serves as an exhaust manifold cover, is provided outside an outer-circumferential face of an exhaust manifold. A heat-resistant sound absorbing material, which is made of glass wool, is stuck to the inner side of the sound insulation cover, a space area is provided between the heat-resistant sound absorbing material and the outer-circumferential face of the exhaust manifold, and thus, this sound insulation cover is configured to function as an exhaust manifold cover with sound-insulating and heat-insulating functionality (see JP S59-102932U1, page 4, lines 12 to 18, and the drawings).

[Background Art 3]

As a front grill with a structure in which a large number of recessed portions, which are recessed toward the back side, are formed in portions surrounded by bridge members as mentioned above, there is a front grill with a structure in which a plate-shaped porous member is attached, with a predetermined gap via a spacer, to the back side of a lattice-shaped frame portion, in which vertical bridges and horizontal bridges intersect each other (see JP 2002-68018A, paragraphs 0011 and 0012, and FIGS. 1 to 3).

[Problem 1]

A problem regarding [Background Art 1] is as follows.

In the aforementioned work vehicle, the link mechanism includes: an upper link with a front end portion supported so as to be able to pivot up and down around an upper pivot axis by a link support portion formed in the vehicle body, and a rear end portion joined so as to be able to relatively pivot around an upper joint axis by the wheel support portion; and a lower link with a front end portion supported so as to be able to pivot up and down around a lower pivot axis by the link support portion, and a rear end portion joined so as to be able to relatively pivot around a lower joint axis by the wheel support member.

When the vehicle body is in an unloaded state, the lower joint axis is set so as to be located lower than the lower pivot axis, and thus, the minimum ground height of the vehicle body can be readily maintained, and the ramp angle can be readily maintained. Thus, with the setting in which the lower joint axis is located lower than the lower pivot axis, if one of the left and right traveling wheels is lowered and the other one is raised, the lowered traveling wheel is displaced forward from the position thereof before being lowered, and the raised traveling wheel is displaced rearward from the position thereof before being raised, and therefore, a position shift in the front-rear direction occurs between one of the traveling wheels and the other one of the traveling wheels. As the position shift in the front-rear direction increases between the one of the traveling wheels and the other one of the traveling wheels, the tilt angle of the wheel support member relative to the vehicle-body front-rear direction in a plan view increases, and thus, yawing of the vehicle body is likely to occur.

The present invention provides a work vehicle in which the minimum ground height and the ramp angle can be readily maintained, whereas yawing of the vehicle body is unlikely to occur even if the left and right traveling wheels are raised and lowered in opposite directions.

[Problem 2]

A problem regarding [Background Art 2] is as follows.

The conventional technique described in [1] above is useful in that the sound-insulating and heat-insulating functions for the exhaust manifold can be obtained by using the aforementioned sound insulation cover as an exhaust manifold cover.

However, the technique described in this structure has the following problem in the case of applying this technique to a work vehicle.

That is to say, there is concern that weeds or the like will enter the space area formed between the outer-circumferential face of the exhaust manifold and the inner-circumferential face of the sound insulation cover and cause a fire, or weeds or the like will be caught on an attachment bracket or the like that protrudes outwards of the sound insulation cover and be deposited thereon, for example.

In the present invention, a plate-shaped heat-insulating cover, which is made of a flexible heat-insulating material, is used separately from an exhaust manifold cover for covering the outer-circumferential face of the exhaust manifold cover, and is bent into a shape that follows an upper face of the engine body and an upper face of the exhaust manifold cover. The present invention thus makes it possible to readily suppress deposition of weeds or the like on the exhaust manifold and achieve an effective heat-insulating function.

[Problem 3]

A problem regarding [Background Art 3] is as follows.

According to the aforementioned conventional technique described in JP 2002-68018A, a plate-shaped porous member is attached to the bottom face side of recessed areas in the portions surrounded by the bridge members of the front grill. According to the structure in which the plate-shaped porous member is thus attached to the bottom face side of the recessed areas, when the front grill is viewed from the front, it is likely to be recognized that the front grill has a structure with an excellent appearance in which the recessed portions are deep.

However, if, for example, a non-porous flat plate body is attached to the bottom face side of the recessed areas in portions where ventilation is not needed, the recessed areas are likely to be recognized as being not very deep and being shallow in a front view thereof unless the recessed areas are made considerably deep, and there is concern that this will not give a dignified impression and will have a negative affect on the appearance thereof. There is room for improvement in this regard.

The present invention aims to improve, with a simply elaborated structure, the appearance of the recessed areas of the front grill even in an area where ventilation is not needed, of the recessed areas in portions surrounded by the bridge members of the front grill.

SUMMARY OF THE INVENTION

A means to solve [Problem 1] is as follows.

A work vehicle according to the present invention includes: a wheel support member configured to support a pair of left and right traveling wheels; a link mechanism configured to support the wheel support member such that the wheel support member can be raised and lowered, the link mechanism being provided spanning between a vehicle body and the wheel support member; a suspension mechanism configured to elastically support the wheel support member, the suspension mechanism being provided spanning between a suspension support portion, which is formed on the vehicle body, and the wheel support member; and a lateral link configured to restrict leftward and rightward movement of the wheel support member, the lateral link being joined to a vehicle body-side support portion, which is formed on the vehicle body, and to a wheel-side support portion, which is formed on the wheel support member, wherein the link mechanism has: an upper link with an front end portion supported so as to be able to pivot up and down around an upper pivot axis by a link support portion, which is formed on the vehicle body, and with a rear end portion joined so as to be able to relatively pivot around an upper joint axis by the wheel support member; and a lower link with a front end portion supported so as to be able to pivot up and down around a lower pivot axis by the link support portion, and with a rear end portion joined to the wheel support member so as to be able to relatively pivot around a lower joint axis, a distance between the upper pivot axis and the upper joint axis is set shorter than a distance between the lower pivot axis and the lower joint axis, a gap width between the upper joint axis and the lower joint axis is set larger than a gap width between the upper pivot axis and the lower pivot axis, and when the vehicle body is in an unloaded state, the lower joint axis is located lower than the lower pivot axis.

According to this configuration, when the vehicle body is in an unloaded state, the lower joint axis is located lower than the lower pivot axis, whereas a position shift in the front-rear direction between one of the traveling wheels and the other one of the traveling wheels occurring when the left and right traveling wheels are raised and lowered in opposite directions is suppressed, compared with a configuration in which the distance between the upper pivot axis and the upper joint axis is the same as the distance between the lower pivot axis and the lower joint axis, and the gap width between the upper joint axis and the lower joint axis is the same as the gap width between the upper pivot axis and the lower pivot axis. Thus, the minimum ground height and the ramp angle can be readily maintained, whereas the tilt angle of the wheel support member relative to the vehicle-body front-and-rear direction in a plan view does not significantly increase even when the left and right traveling wheels are raised and lowered in opposite directions, and yawing of the vehicle body is unlikely to occur.

In the present invention, it is preferable that the upper link is supported via an elastic member by the link support portion, and the lower link is supported via an elastic member by the link support portion.

According to this configuration, even if jamming is about to occur between the upper link and the link support portion, the elastic member is deformed and the jamming is resolved. Also, even if jamming is about to occur between the lower link and the link support portion, the elastic member is deformed and the jamming is resolved.

Therefore, the distance between the upper pivot axis and the upper joint axis is shorter than the distance between the lower pivot axis and the lower joint axis, and the gap width between the upper joint axis and the lower joint axis is larger than the gap width between the upper pivot axis and the lower pivot axis, whereas the upper link and the lower link smoothly pivot relative to the link support portion, and the traveling wheels are smoothly raised and lowered.

In the present invention, it is preferable that the upper link is supported via an elastic member by the wheel support member, and the lower link is supported via an elastic member by the wheel support member.

According to this configuration, even if jamming is about to occur between the upper link and the wheel support member, the elastic member is deformed and the jamming is resolved, and even if jamming is about to occur between the lower link and the wheel support member, the elastic member is deformed and the jamming is resolved. Therefore, the distance between the upper pivot axis and the upper joint axis is shorter than the distance between the lower pivot axis and the lower joint axis, and the gap width between the upper joint axis and the lower joint axis is larger than the gap width between the upper pivot axis and the lower pivot axis, whereas the upper link and the lower link smoothly pivot relative to the wheel support member, and the traveling wheels are smoothly raised and lowered.

In the present invention, it is preferable that the wheel-side support portion protrudes upward from the wheel support member, and the vehicle body is provided with a cushion material that comes into contact with an upper end portion of the wheel-side support portion when the wheel support member is raised.

According to this configuration, a raising limit of the traveling wheels can be set by an upper limit setting structure with a simple structure using a wheel-side support portion as a member for setting a raising limit of the wheel support member.

In the present invention, it is preferable that the wheel-side support portion has: a pair of vertical plate portions arranged separately on a front and rear sides of an end portion of the lateral link; a joint plate portion configured to join lateral end portions of the pair of vertical plate portions to each other; an upper plate portion configured to receive the cushion material, in a state of being abutted against upper ends of the pair of vertical plate portions from above; and a screw shaft member configured to allow the end portion to be pivotably supported by the pair of vertical plate portions, and fasten the pair of vertical plate portions toward the end portion, the screw shaft member being inserted into the pair of vertical plate portions and the end portion, and the upper plate portion extends from the joint plate portion and is not attached to the pair of vertical plate portions.

According to this configuration, the pair of vertical plate portions can be brought close to the end portion of the lateral link by a fastening force of the screw shaft member, and thus, the lateral link can be firmly supported by the wheel-side support portion such that looseness does not occur between the lateral link and the wheel-side support portion.

A means to solve [Problem 2] is as follows.

Features of a work vehicle according to the present invention lie in a work vehicle in which an exhaust manifold that is continuous with cylinders in an engine body is provided protruding from a side portion of the engine body, and an exhaust manifold cover that covers an upper side of the exhaust manifold is provided adjacent to the engine body, the work vehicle including: a heat-insulating cover having a plate shape made of a flexible heat-insulating material at a position spanning between an upper portion of the engine body and the exhaust manifold cover, wherein the heat-insulating cover is bent into a shape that follows an upper face of the engine body and an upper face of the exhaust manifold cover, a portion of the heat-insulating cover that opposes the exhaust manifold cover is fixed to the exhaust manifold cover, and a portion of the heat-insulating cover that opposes the engine body is provided in a state of being in contact with the engine body.

According to the present invention, the plate-shaped heat-insulating cover is provided at a position spanning between the upper portion of the engine body and the exhaust manifold cover, and thus, there is little concern that weeds or the like will enter from above and be deposited in a gap between the upper portion of the engine body and the exhaust manifold cover.

Furthermore, since the heat-insulating cover is made of a flexible heat-insulating material and is bent into a shape that follows the upper face of the engine body and the upper face of the exhaust manifold cover, the occurrence of a gap from which weeds or the like may also enter from the horizontal direction can be suppressed between the heat-insulating cover and the upper face of the engine body and between the heat-insulating cover and the upper face of the exhaust manifold cover. Accordingly, a situation can be readily avoided where weeds or the like enter between the heat-insulating cover and the upper face of the engine body and between the heat-insulating cover and the upper face of the exhaust manifold cover and come into contact with the engine body and the exhaust manifold cover that are heated to a high temperature.

In addition, the heat-insulating cover is fixed to the exhaust manifold cover, and the portion of the heat-insulating cover that opposes the engine body is merely in contact with the engine body, and is not joined to the engine body. That is to say, the portion of the heat-insulating cover that opposes the engine body is attached in a state of being abutted against the engine body side by bending the heat-insulating cover, which is flexible, into a shape that follows the upper face of the engine body and the upper face of the exhaust manifold cover. With this configuration, the heat-insulating cover for covering the gap between the upper portion of the engine body and the exhaust manifold cover can be fixed without using a structure for attachment to the engine body side, and simplification of the attachment structure and ease of maintenance can be achieved with little thermal effect from the engine body side.

In the above configuration, it is preferable that the exhaust manifold includes a collecting pipe portion having a cylindrical shape that is connected to a plurality of passages continuous with the cylinders in the engine body, the collecting pipe portion is arranged, in a lateral orientation with a cylinder axis direction parallel to a horizontal direction, in an area adjacent to the upper portion of the engine body, and the exhaust manifold cover is formed to have a shape that covers an outer periphery of the collecting pipe portion.

According to this configuration, the cylindrical collecting pipe portion provided in the exhaust manifold is arranged in a lateral orientation with the cylinder axis direction parallel to the horizontal direction, in an area adjacent to the upper portion of the engine body. As a result, the exhaust manifold is located in a high area near the engine upper portion as a whole. Thus, an exhaust pipe, which is continuous with the exhaust manifold, can be readily arranged reasonably using an empty space that is a relatively sufficient space near the engine upper portion.

In the above configuration, it is preferable that each of the upper face of the engine body and the upper face of the exhaust manifold cover has an inclined face that is lower on a side on which the engine body and the exhaust manifold cover are closer to each other, and the heat-insulating cover is bent into a V shape along the upper face of the engine body and the upper face of the exhaust manifold cover, and the heat-insulating cover is fixed via a rivet to the inclined face in the upper face of the exhaust manifold cover.

According to this configuration, the heat-insulating cover is bent into a V shape along the upper face of the engine body and the upper face of the exhaust manifold cover. For this reason, the portion of the heat-insulating cover that is in contact with the upper face of the engine body can be stably attached in a state of being pressed against the upper face side of the engine body, due to the weight of the heat-insulating cover itself and the occurrence of the effect of pressing the heat-insulating cover itself, which is bent into a V shape, against the engine body side.

Also, the portion of the heat-insulating cover that is attached to the exhaust manifold cover is fixed to the inclined face in the upper face of the exhaust manifold cover. That is to say, due to the portion being fixed to the inclined face, deposits are likely to slip down with vibrations occurring during a travel and engine vibrations. Furthermore, fixing is performed using a rivet that protrudes from the inclined face by only a small amount of protrusion and is unlikely to be caught, and thus, a situation can be readily avoided where weeds or the like are caught on the rivets for fixing and the amount of deposit increases.

In the above configuration, it is preferable that the exhaust manifold cover is joined via a joint bolt to the exhaust manifold, an open hole corresponding to an area where a head portion of the joint bolt is present is formed in the heat-insulating cover, and the head portion and therearound of the joint bolt, which protrudes from the upper face of the exhaust manifold cover, are surrounded by the open hole.

According to this configuration, the head portion and therearound of the joint bolt for joining and fixing the exhaust manifold cover to the exhaust manifold are in a state of being surrounded by the open hole formed in the heat-insulating cover. Thus, the amount by which the joint bolt head portion protrudes from the upper face of the heat-insulating cover can be reduced. Accordingly, a situation can be readily avoided where weeds or the like are caught on the portion at which the joint bolt head portion is present and the amount of deposit increases, compared with the case where the amount by which the joint bolt head protrudes is large.

A means to solve [Problem 3] is as follows.

Feature of a front grill according to the present invention lie in including: a large number of bridge members that intersect each other in a front view thereof, wherein a large number of recessed portions, each of which is recessed toward a back side, are formed in portions surrounded by the bridge members, of the recessed portions, recessed portions formed in an area where ventilation is not needed are each provided with a bottom face portion located on the back side relative to end edges of the bridge members on a front side, and a small protruding portion that protrudes toward the front side relative to the most distal portion of the bottom face portion is formed in the bottom face portion.

According to the present invention, the small protruding portion is formed in the bottom face portion of the recessed portion formed in an area where ventilation is not needed, the small protruding portion protruding toward the front side relative to the most distal portion of the bottom face portion. For this reason, compared with the bottom face portion, which is simply flat, a large amount of light incident on the recessed portion from the front side can be reflected off the small protruding portion of the bottom face portion to scatter to the periphery, and the amount of light reflected toward the front can be readily reduced.

Accordingly, when the front grill is viewed from the front side, the front grill is likely to be readily recognized as having a structure with an excellent appearance in which the recessed part is deep, relative to the recess depth of the recessed portion.

In the above configuration, it is preferable that a plurality of the small protruding portions are formed in each one of the recessed portions.

According to this configuration, incident light can be more effectively scattered than in the case where a single small protruding portion is provided.

In the above configuration, it is preferable that the small protruding portion includes an inclined face that obliquely intersects incident light from front.

According to this configuration, since an inclined face that obliquely intersects incident light from the front is provided, the light amount of reflected light from the front side can be reduced more reliably.

DETAILED DESCRIPTION OF PREFERRED EMBODIMENTS

First Embodiment

Hereinafter, the first embodiment of the present invention will be described based on the drawings.

Note that, in the following description, regarding a traveling vehicle body of a multipurpose work vehicle, "vehicle-body front side" refers to the direction indicated by an arrow F shown in FIG. 1, "vehicle-body rear side" refers to the direction indicated by an arrow B, "vehicle-body upper side" refers to the direction indicated by an arrow U, "vehicle-body lower side" refers to the direction indicated by an arrow D, "vehicle-body left side" refers to the direction toward the paper front side, and "vehicle-body right side" refers to the direction toward the overleaf side.

Configuration of Entire Multipurpose Work Vehicle

Figure 1:
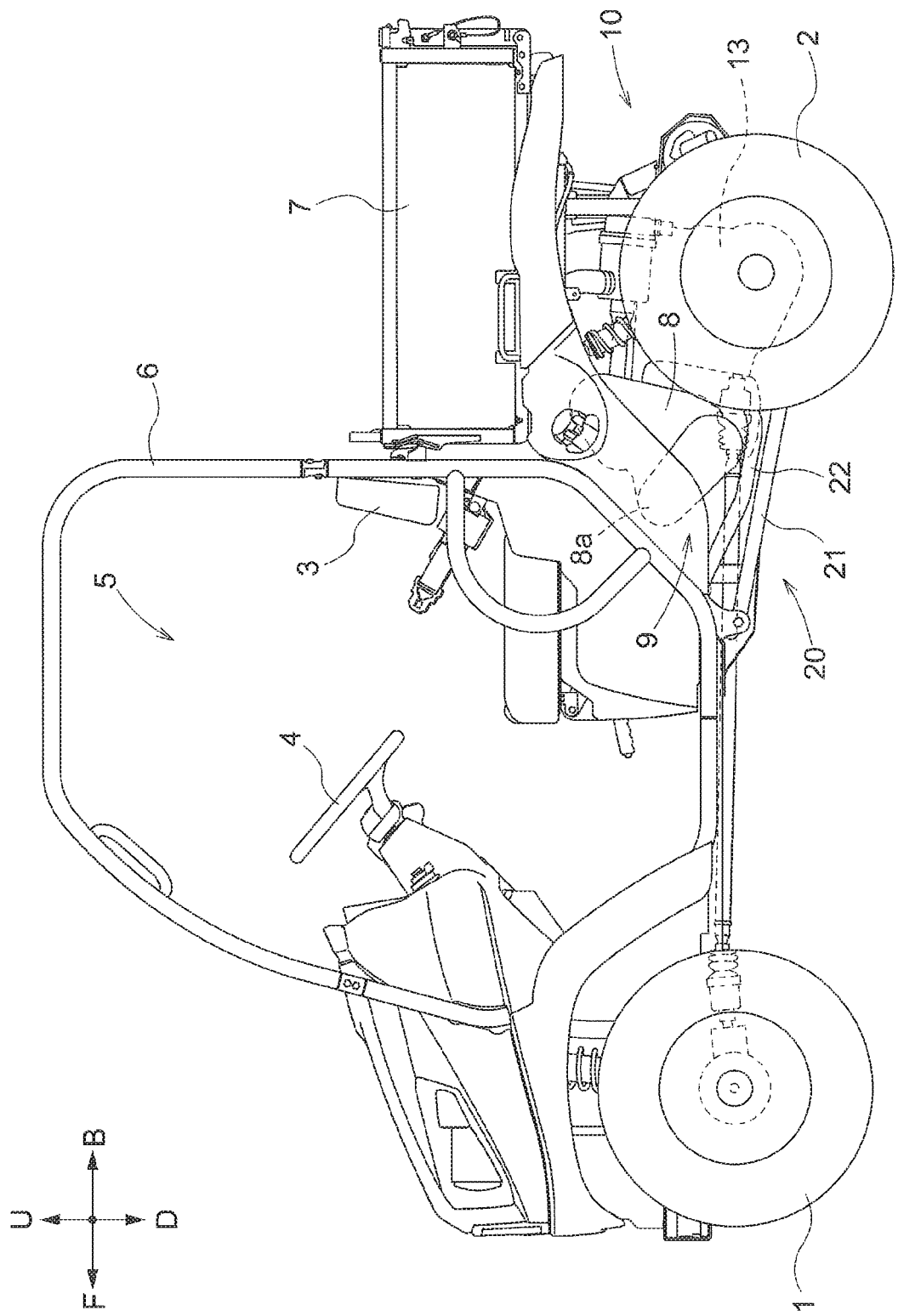
FIG. 1 illustrates a first embodiment (FIGS. 2 to 11 also illustrate the same), and is a left side view that shows an entire multipurpose work vehicle.

As shown in FIG. 1, the multipurpose work vehicle includes a traveling vehicle body that is equipped with a pair of left and right front wheels 1 in a steerable and drivable manner, and a pair of left and right rear wheels 2 in a drivable manner. A driving section 5, which has a driver's seat 3 and a steering wheel 4 for steering the front wheels 1, is formed in a front portion of the traveling vehicle body. The driving section 5 includes a ROPS 6 that covers a passenger space. A carrier 7 is provided in a rear portion of the traveling vehicle body. A motive portion 9 with an engine 8 is formed below the carrier 7.

Regarding Configuration of Suspension System for Rear Wheels

Figure 2:
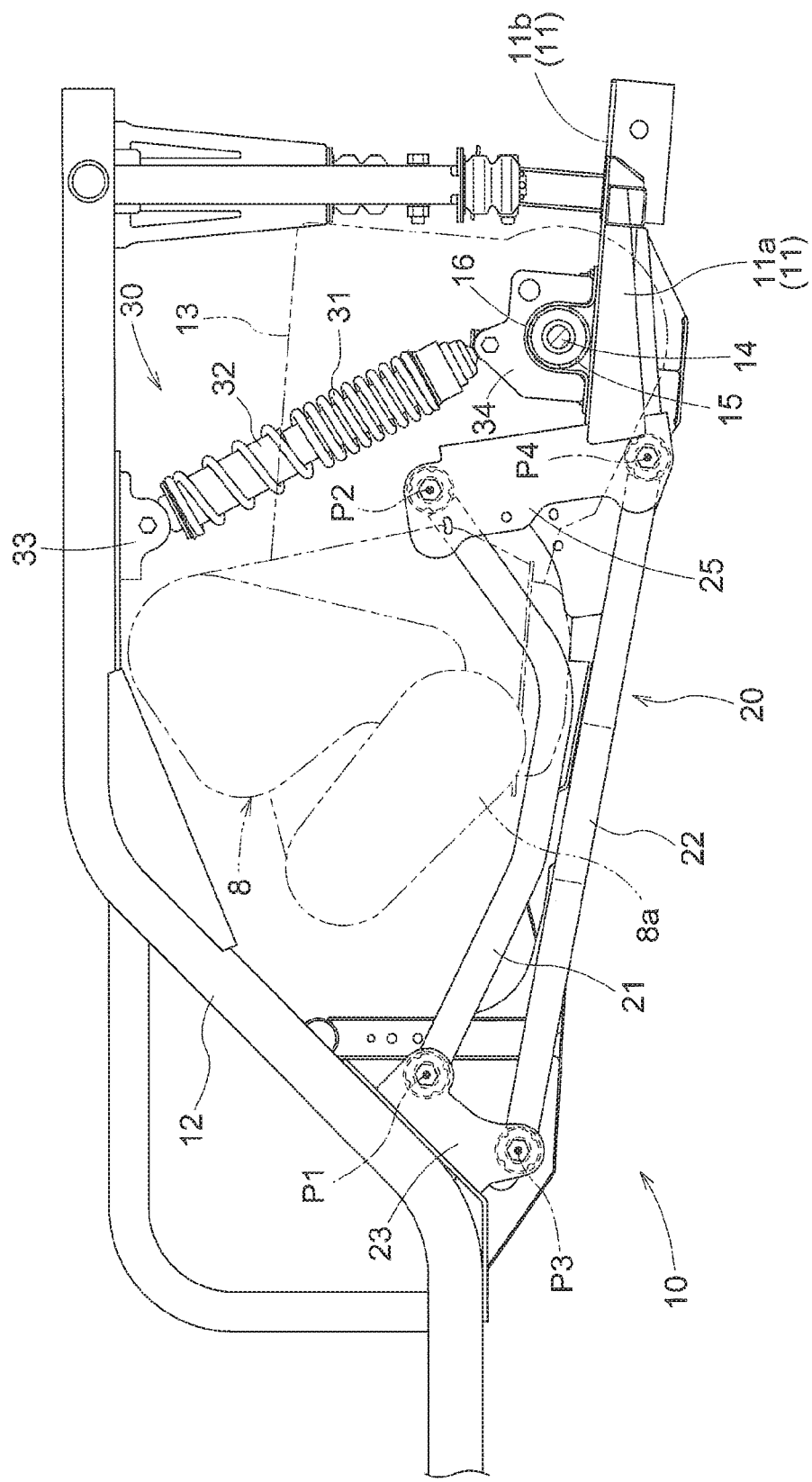
FIG. 2 is a left side view that shows a suspension system for rear wheels.
Figure 3:
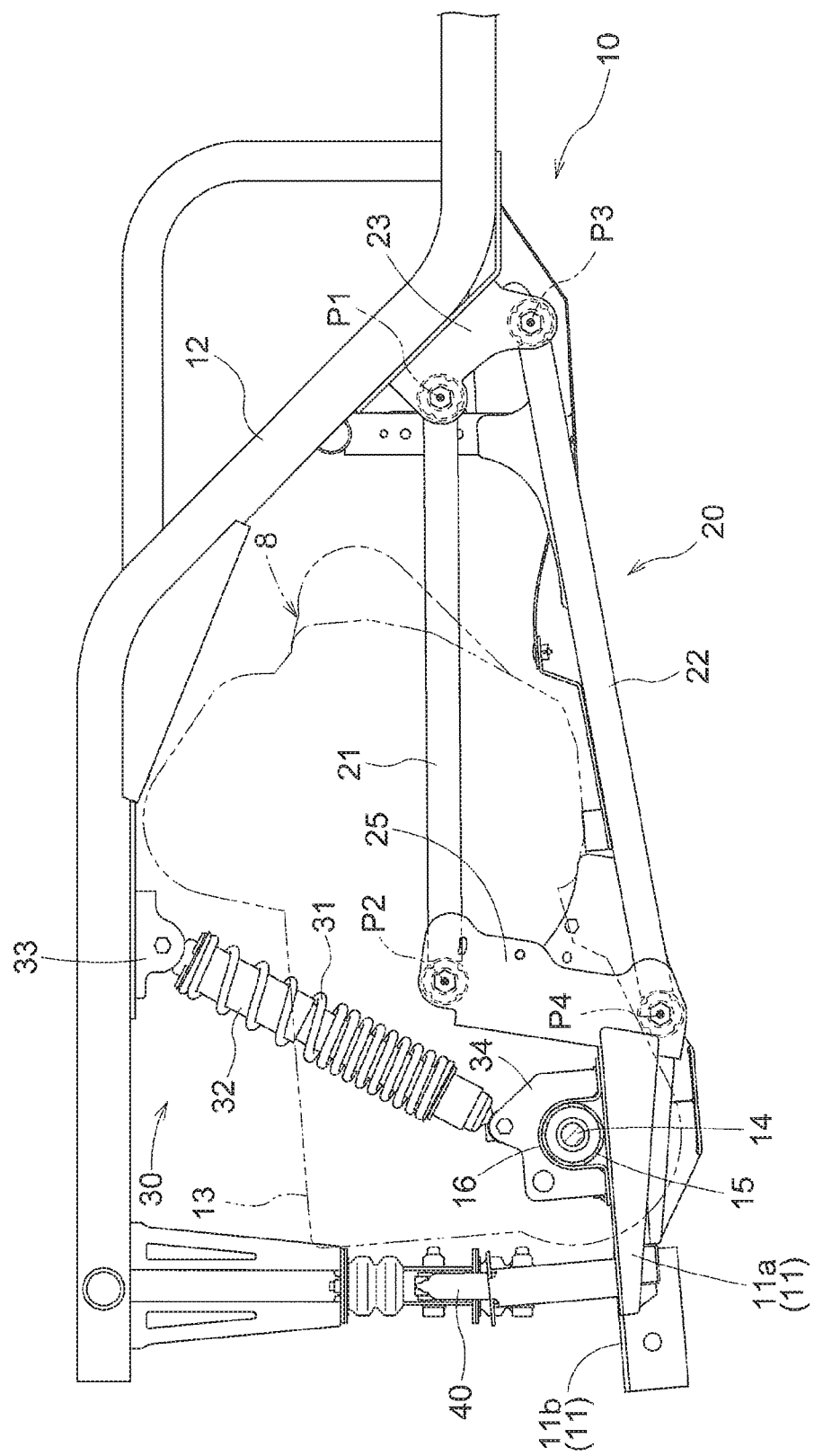
FIG. 3 is a right side view that shows the suspension system for the rear wheels.
Figure 4:
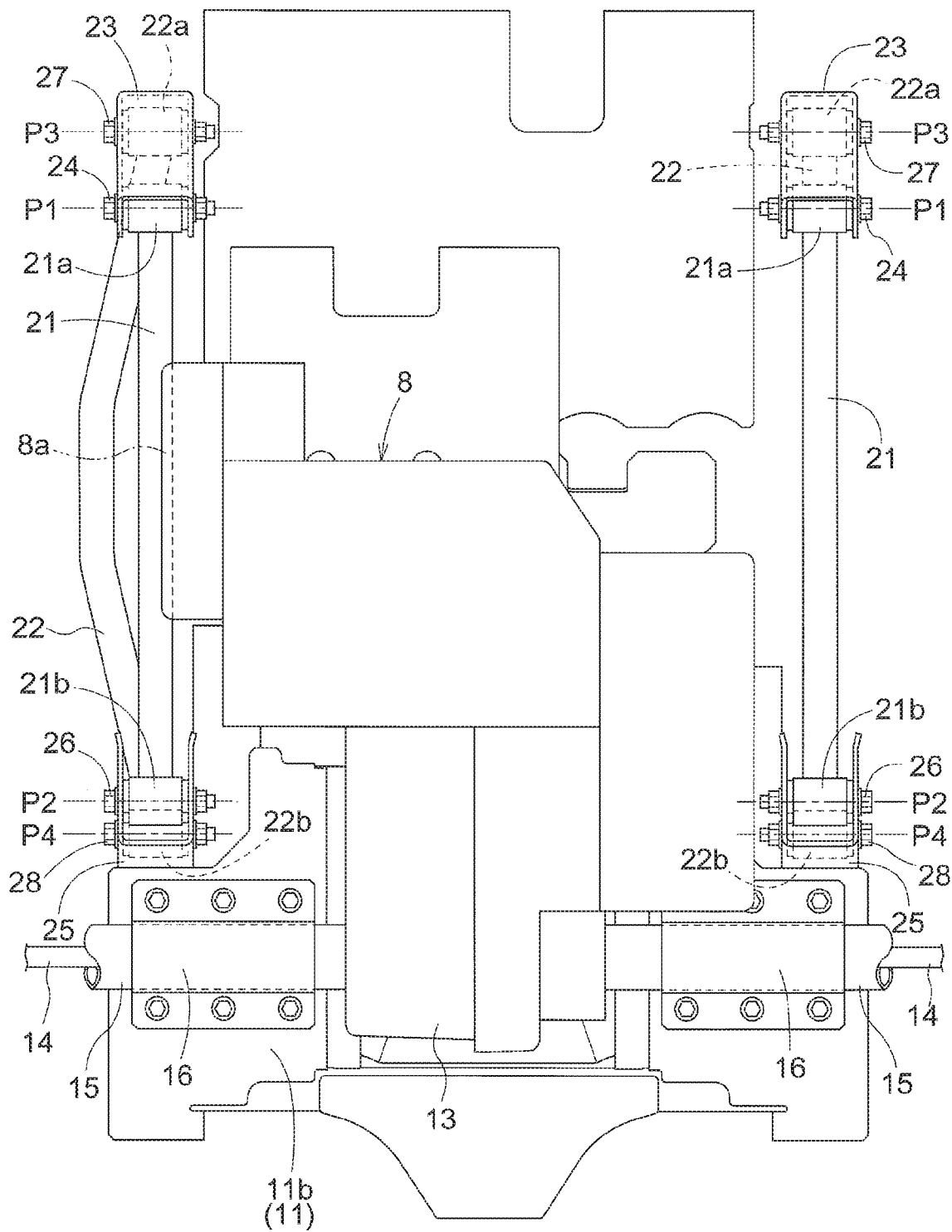
FIG. 4 is a plan view that shows the suspension system for the rear wheels.
Figure 5:
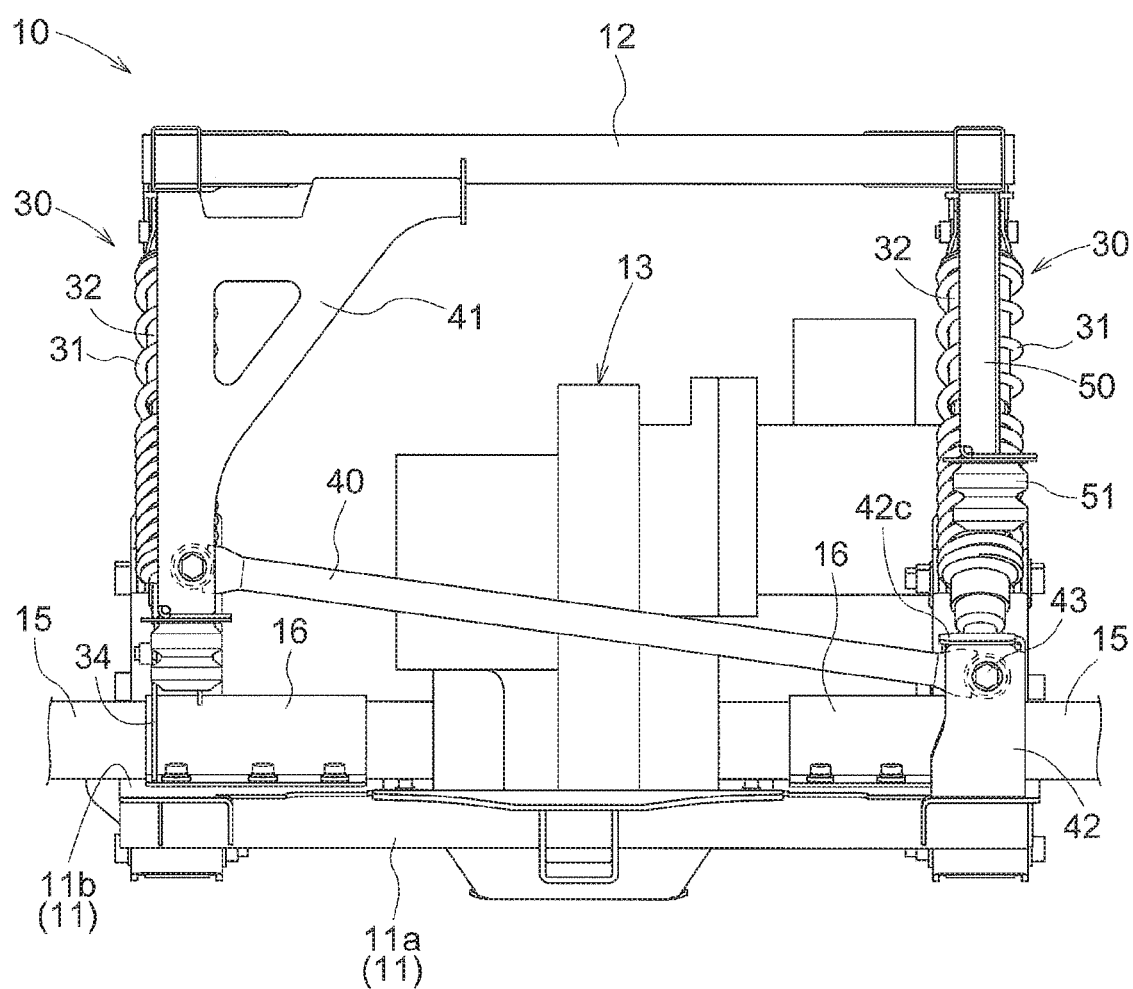
FIG. 5 is a rear view that shows the suspension system for the rear wheels.

FIG. 2 is a left side view that shows a suspension system 10 for the rear wheels 2. FIG. 3 is a right side view that shows the suspension system 10 for the rear wheels 2. FIG. 4 is a plan view that shows the suspension system 10 for the rear wheels 2. FIG. 5 is a rear view that shows the suspension system 10 for the rear wheels 2.

As shown in FIGS. 2 to 5, the suspension system 10 for the rear wheels 2 includes a wheel support member 11, which supports the pair of left and right rear wheels 2, a pair of left and right link mechanisms 20, which allows the wheel support member 11 to be supported by the vehicle body frame 12 so as to be able to be raised to and lowered to enable the left and right rear wheels 2 to be raised and lowered relative to the vehicle body frame 12, a suspension mechanism 30, which enables the left and right rear wheels 2 to be elastically supported by elastically supporting the wheel support member 11, and a lateral link 40, which restricts leftward and rightward movement of the wheel support member 11.

Figure 6:
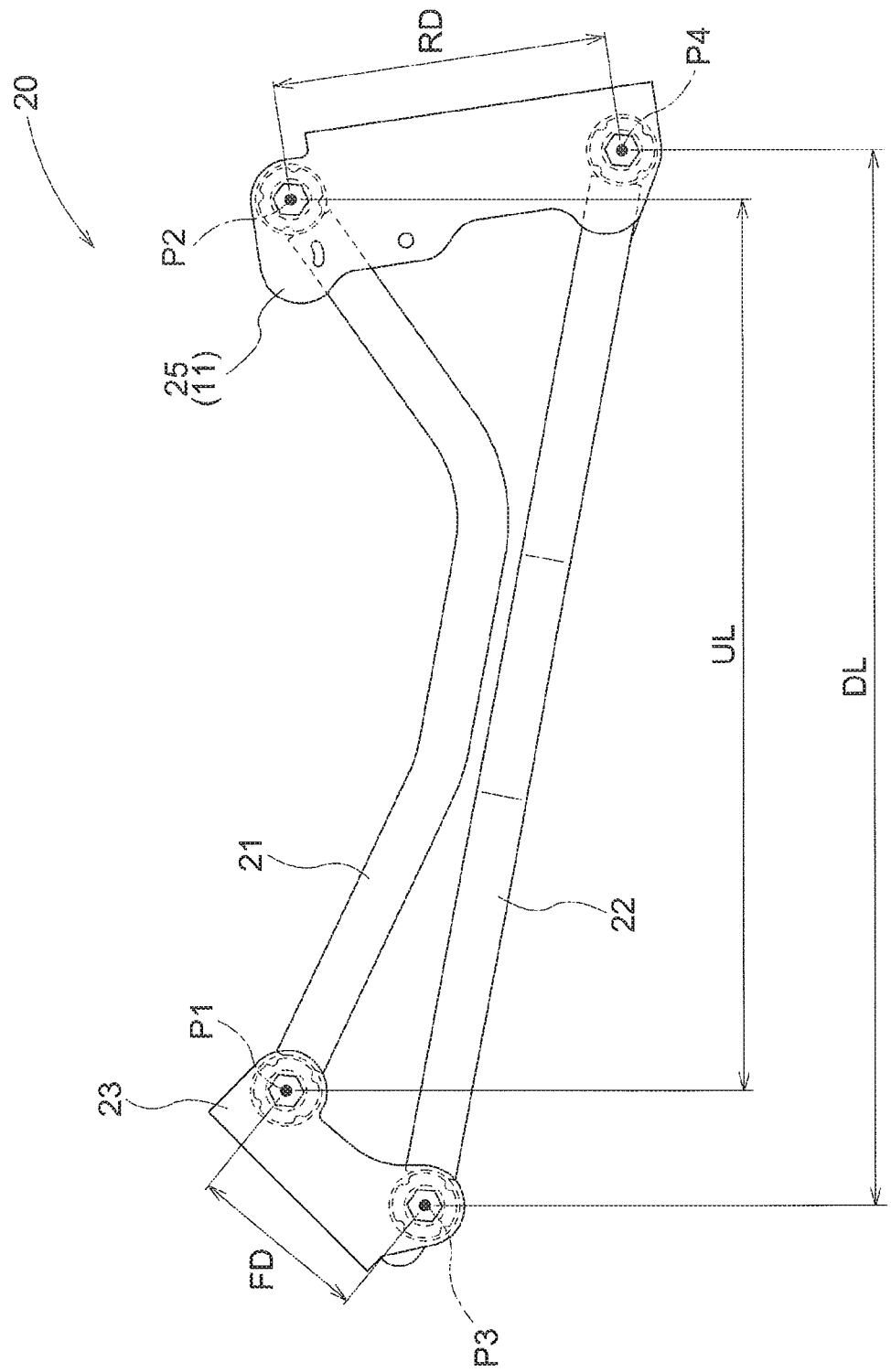
FIG. 6 is a left side view that shows a left link mechanism.

As shown in FIGS. 2, 4, and 6, the wheel support member 11 has a support frame portion 11a, and a placing base portion 11b, which is provided above the support frame portion 11a. A transmission 13, to which motive power from the engine 8 is input, is supported at the center, in the lateral direction, of the wheel support member 11. The engine 8 is joined to the transmission 13, and is supported via the transmission 13 by the wheel support member 11.

As shown in FIGS. 2, 3, and 4, a left rear axle 14 extends leftward from the transmission 13. A right rear axle 14 extends rightward from the transmission 13. A left rear axle case 15 for rotatably supporting the left rear axle 14 and a right rear axle case 15 for rotatably supporting the right rear axle 14 are placed separately on the left part and right part, respectively, of the placing base portion 11b. The left and right rear axle cases 15 are fixed to the placing base portion 11b by a case holder 16, which is fixed to the placing base portion 11b by a joint bolt, in a state of surrounding an outer-circumferential portion of the rear axle case 15. The left and right rear axles 2 are supported by the wheel support member 11 via the rear axles 14 and the transmission 13. That is to say, the left and right rear wheels 2 are supported by the wheel support member 11, in a state where no relative position shift occurs between the left and right rear wheels 2. In this embodiment, the engine 8 and the transmission 13 are supported together with the rear wheels 2 by the wheel support member 11, but this need not be the case. For example, a configuration may alternatively be employed in which the transmission 13 is supported together with the left and right rear wheels 2 by the wheel support member 11, and the engine 8 is not supported by the wheel support member 11. Also, a configuration may alternatively be employed in which only the left and right rear wheels 2 are supported by the wheel support member 11, and the engine 8 and the transmission 13 are not supported by the wheel support member 11.

As shown in FIGS. 2, 3, and 4, each of the left and right link mechanisms 20 has an upper link 21, which extends in the vehicle-body front-rear direction, and a lower link 22, which extends in the vehicle-body front-rear direction.

A front end portion of the upper link 21 is supported so as to be able to pivot around an upper pivot axis P1, which extends in the vehicle-body lateral width direction, by a link support portion 23 on the vehicle body side that is formed on the vehicle body frame 12. Specifically, an upper front boss portion 21a, which is formed at the front end portion of the upper link 21, and the link support portion 23 are joined to each other via an upper pivot shaft 24, which is fitted into the upper front boss portion 21a. The upper pivot shaft 24 has the upper pivot axis P1. A rear end portion of the upper link 21 is supported so as to be able to pivot around an upper joint axis P2, which extends in the vehicle-body lateral width direction, by a link joint portion 25 on the wheel side that is formed at a lateral end portion of the wheel support member 11. Specifically, an upper rear boss portion 21b, which is formed at the rear end portion of the upper link 21, and the link joint portion 25 are joined to each other via an upper joint shaft 26, which is fitted into the upper rear boss portion 21b. The upper joint shaft 26 has the upper joint axis P2.

A front end portion of the lower link 22 is supported so as to be able to pivot around a lower pivot axis P3, which extends in the vehicle-body lateral width direction, at a portion below the portion of the link support portion 23 to which the upper link 21 is joined. Specifically, a lower front boss portion 22a, which is formed at the front end portion of the lower link 22, and the link support portion 23 are joined to each other via a lower pivot shaft 27 that is fitted into the lower front boss portion 22a. The lower pivot shaft 27 has the lower pivot axis P3. A rear end portion of the lower link 22 is supported so as to be able to pivot around a lower joint axis P4, which extends in the vehicle-body lateral width direction, at a portion of the link joint portion 25 below the portion to which the upper link 21 is joined. Specifically, a lower rear boss portion 22b, which is formed at the rear end portion of the lower link 22, and the link joint portion 25 are joined to each other via a lower joint shaft 28, which is fitted into the lower rear boss portion 22b. The lower joint shaft 28 has the lower joint axis P4.

Figure 8:
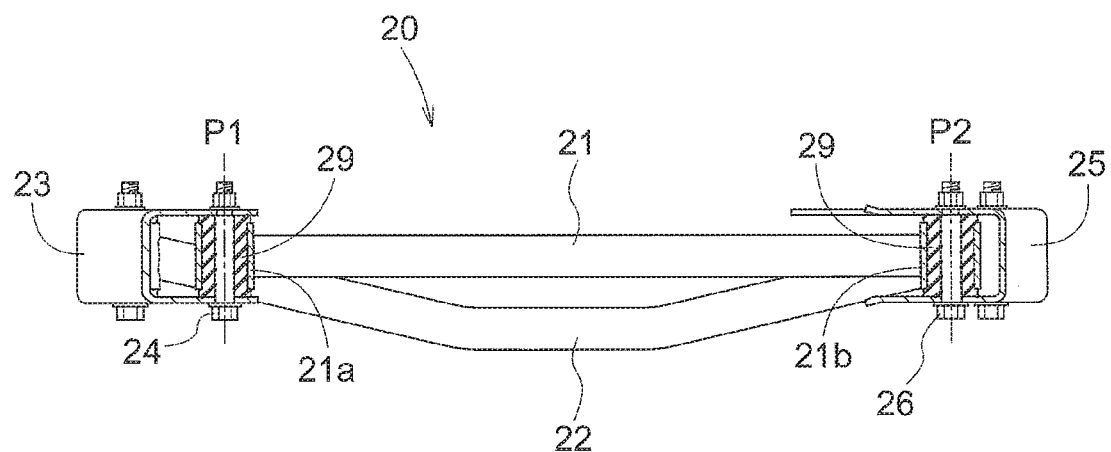
FIG. 8 is a cross-sectional view that shows a support structure for a left upper link.
Figure 9:
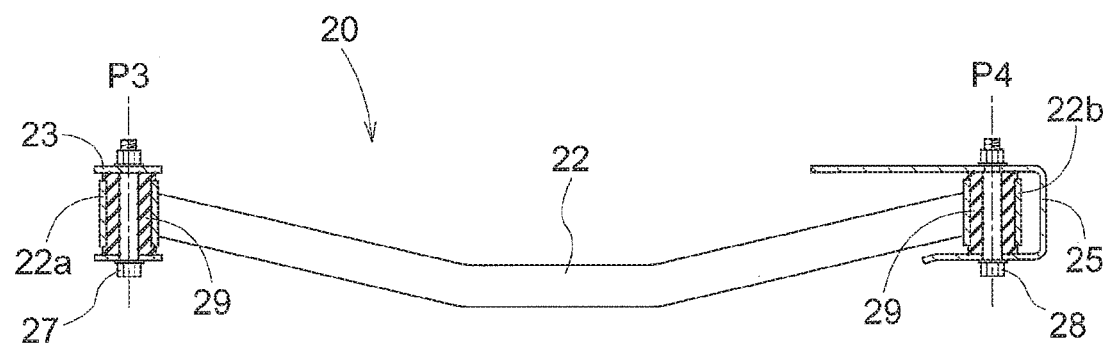
FIG. 9 is a cross-sectional view that shows a support structure for a left lower link.

As shown in FIGS. 8 and 9, in the left link mechanisms 20, elastic members 29 are interposed between the upper link 21 and the link support portion 23, between the lower link 22 and the link support portion 23, between the upper link 21 and the link joint portion 25, and between the lower link 22 and the link joint portion 25. If jamming is about to occur between the upper link 21 and the link support portion 23, between the lower link 22 and the link support portion 23, between the upper link 21 and the link joint portion 25, and between the lower link 22 and the link joint portion 25, the elastic members 29 are elastically deformed, and this elastic deformation resolves the jamming. The elastic members 29 are also interposed in the right link mechanism 20 as well, similarly to the left link mechanism 20.

In this embodiment, the respective elastic members 29 are made to have a cylindrical shape that is fitted into the upper front boss portion 21a and fitted onto the upper pivot shaft 24, a cylindrical shape that is fitted into the lower front boss portion 22a and fitted onto the lower pivot shaft 27, a cylindrical shape that is fitted into the upper rear boss portion 21b and fitted onto the upper joint shaft 26, and a cylindrical shape that is fitted into the lower rear boss portion 22b and fitted onto the lower joint shaft 28, but this need not be the case. For example, the elastic members may alternatively be interposed between the upper pivot shaft 24 and the link support portion 23, between the lower pivot shaft 27 and the link support portion 23, between the upper joint shaft 26 and the link joint portion 25, and between the lower joint shaft 28 and the link joint portion 25.

Figure 7:
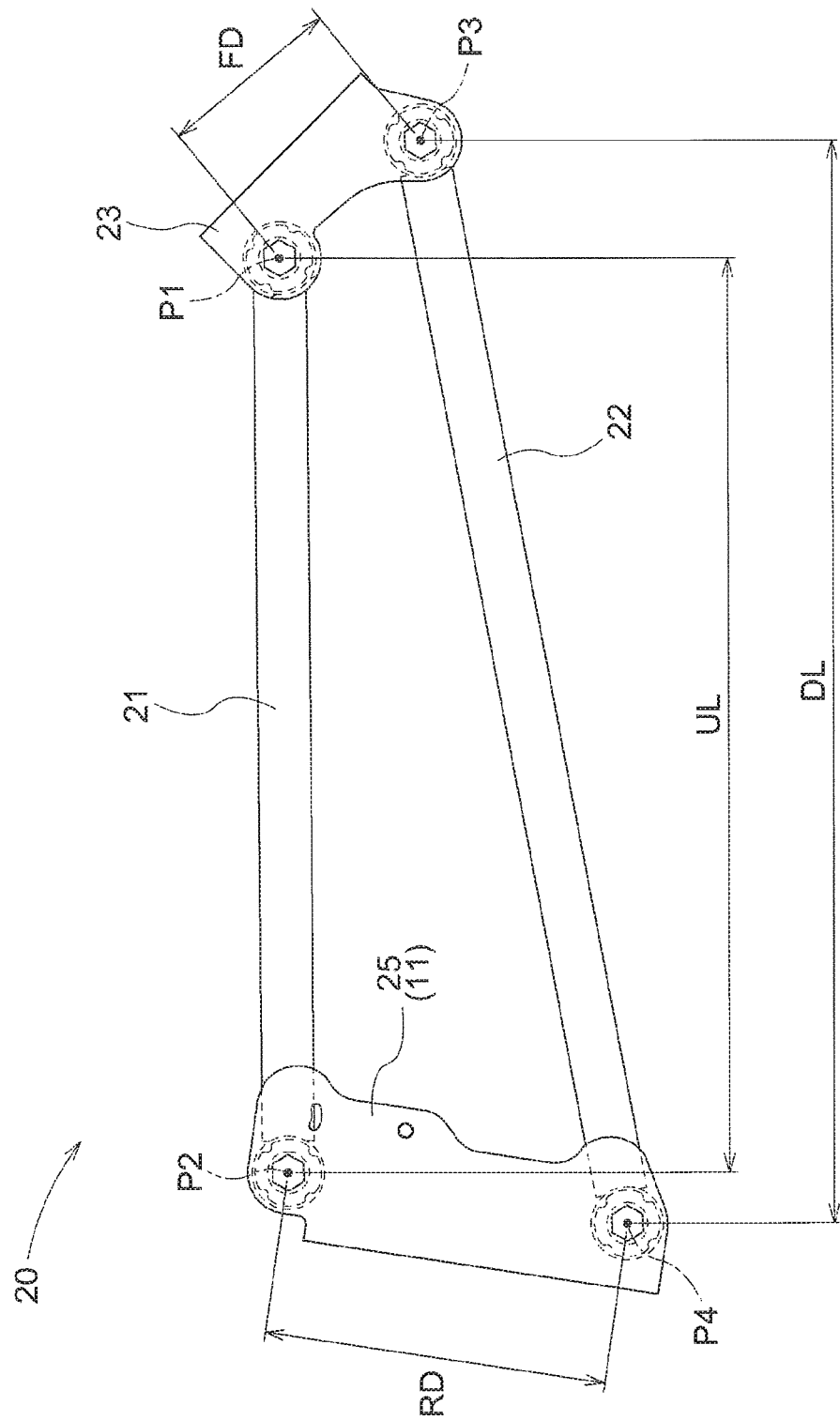
FIG. 7 is a right side view that shows a right link mechanism.

As shown in FIGS. 6 and 7, in the left and right link mechanisms 20, the distance between the upper pivot axis P1 and the upper joint axis P2 is denoted as UL, the distance between the lower pivot axis P3 and the lower joint axis P4 is denoted as DL, the gap width between the upper pivot axis P1 and the lower pivot axis P3 is denoted as FD, and the gap width between the upper joint axis P2 and the lower joint axis P4 is denoted as RD.

The distance UL is set shorter than the distance DL. The gap width RD is set wider than the gap width FD. The link mechanisms 20 are configured such that the lower joint axis P4 is located lower than the lower pivot axis P3, as shown in FIGS. 2 and 3, when the vehicle body is in an unloaded state, i.e. in a state where no occupant is in the driving section 5 and no load is on the carrier 7.

When one of the left and right rear wheels 2 has been lowered to a position below the position thereof in the unloaded state, and the other one of the rear wheels 2 has been raised to a position above the position thereof in the unloaded state, even if jamming is about to occur between the upper link 21 and the link support portion 23, between the lower link 22 and the link support portion 23, between the upper link 21 and the link joint portion 25, and between the lower link 22 and the link joint portion 25, the jamming is resolved by elastic deformation of the elastic members 29, and the left and right upper links 21 and lower links 22 are smoothly raised and lowered. In this case, the lowered rear wheel 2 is displaced forward of its position before being lowered, the raised rear wheel 2 is displaced rearward of its position before being raised, the wheel support member 11 tilts left and right as well as back and forth, and a position shift occurs between the left and right rear wheels 2 such that the lowered rear wheel 2 is located forward of the raised rear wheel 2. However, due to the distance UL being shorter than the distance DL, the gap width RD being larger than the gap width FD, and the lower joint axis P4 being located lower than the lower pivot axis P3 in the unloaded state, only a slight position shift in the front-rear direction shift occurs between the lowered rear wheel 2 and the raised rear wheel 2.

As shown in FIGS. 3, 4, and 7, the upper link 21 and the lower link 22 in the right link mechanism 20 are formed to have a straight shape. As shown in FIGS. 2, 4, and 6, the upper link 21 in the left link mechanism 20 is formed to have a curved shape with an intermediate portion located lower than a front portion and a rear portion so as to avoid, downward, an alternator cover 8a, which is provided on a lateral side portion of the engine 8. The lower link 22 in the left link mechanism 20 is formed to have a curved shape with an intermediate portion protruding laterally outward so as to be raised and lowered while avoiding the intermediate portion of the upper link 21 laterally outward.

As shown in FIGS. 2, 3, and 5, the suspension mechanism 30 has a pair of left and right suspension springs 31 and a pair of left and right dampers 32.

As shown in FIGS. 2 and 3, the left and right dampers 32 are joined to respective suspension support portions 33 on the vehicle body side that are formed on the vehicle body frame 12, and to suspension support portions 34 on the wheel side that are formed on the case holder 16 and are thus provided in the wheel support member 11, and extend and contract as the wheel support member 11 is raised and lowered. The left and right suspension springs 31 are separately provided for the left and right dampers 32, respectively, and are fitted onto the respective dampers 32. An upper end portion of each of the suspension springs 31 is received and supported by a spring lock portion formed in an upper part of the corresponding damper 32, and is supported by the corresponding suspension support portion 33 on the vehicle body side via the upper part of the damper 32. A lower end portion of each of the suspension springs 31 is received and locked by a spring lock portion formed in a lower part of the damper 32, and is supported via the lower part of the damper 32 by the wheel support member 11. The left and right suspension springs 31 expand and contract as the respective dampers 32 expand and contract.

As shown in FIG. 5, the lateral link 40 is joined to a vehicle body-side support portion 41, which extends downward from a rear end portion of the vehicle body frame 12, and a wheel-side support portion 42, which protrudes upward from a lateral end portion of the wheel support member 11.

Figure 10:
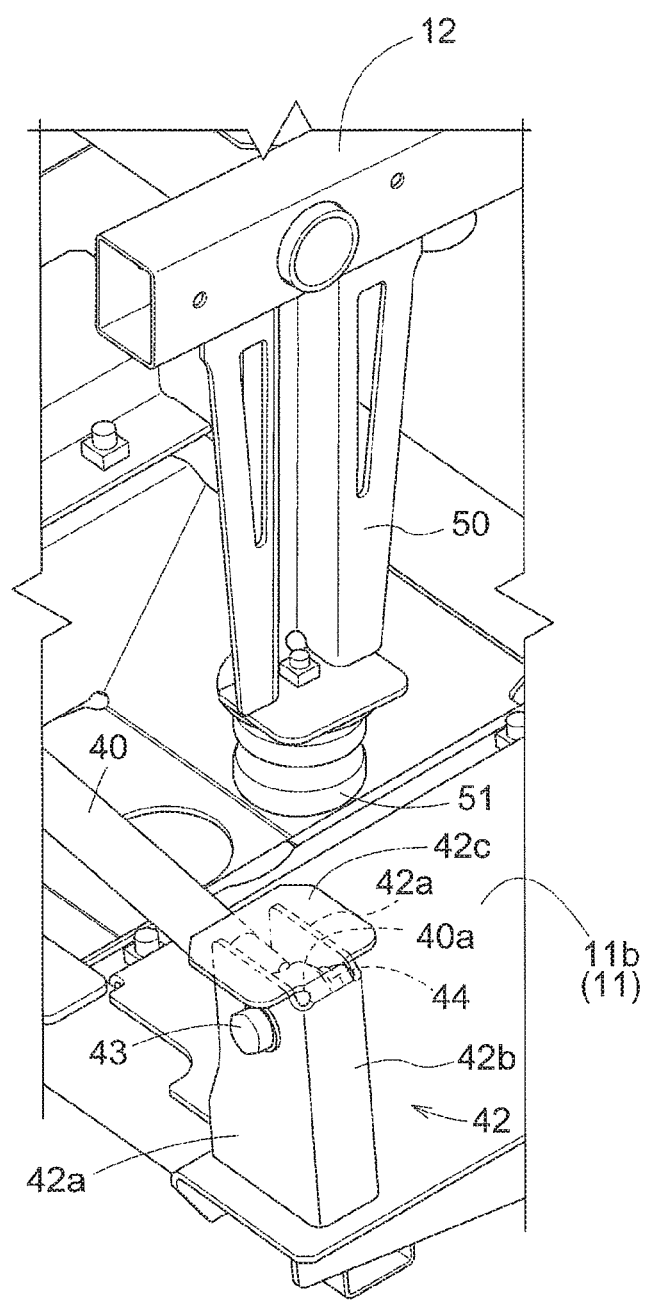
FIG. 10 is a perspective view that shows a wheel-side support portion and a stopper member.
Figure 11:
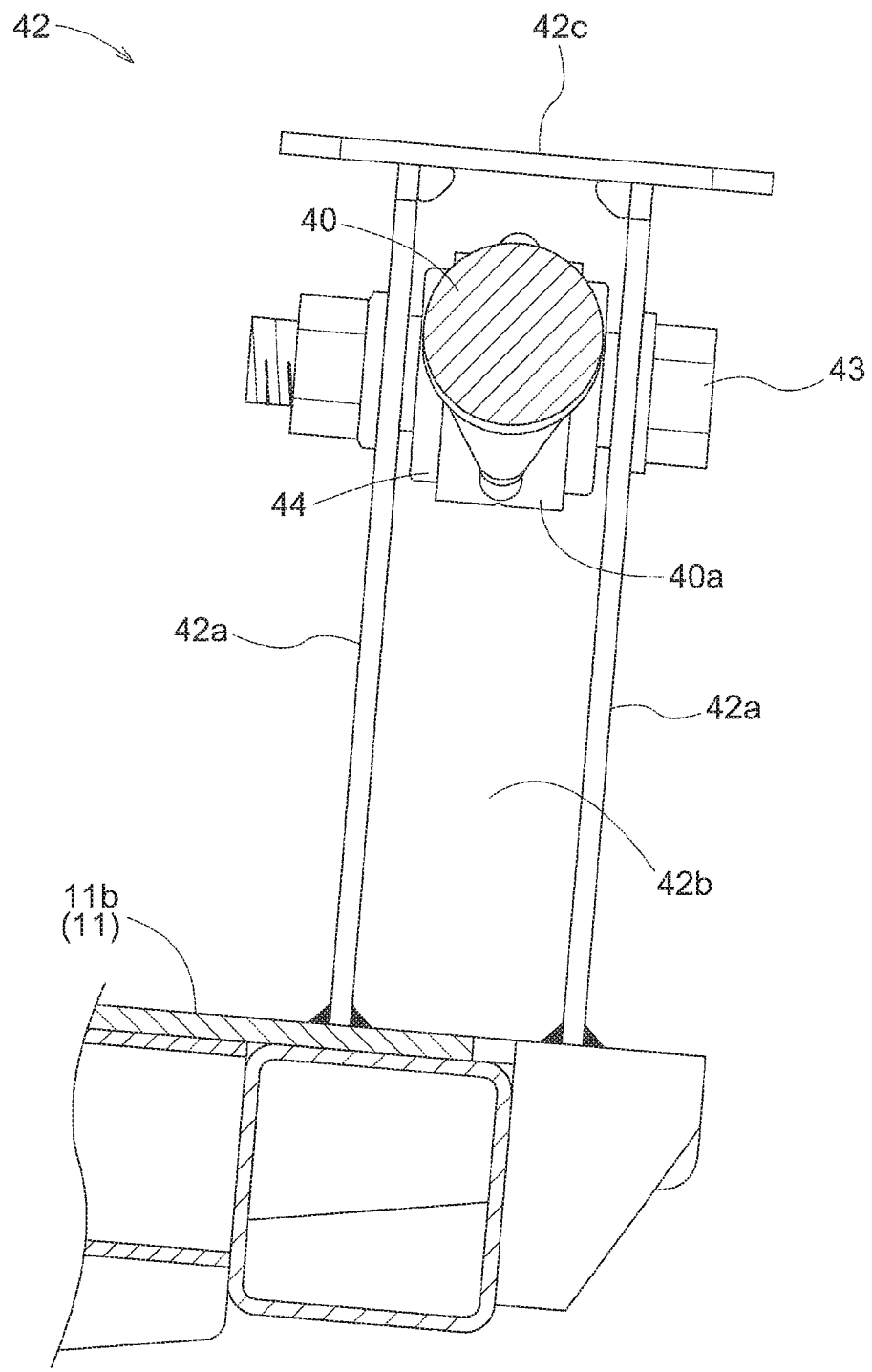
FIG. 11 is a side view that shows the wheel-side support portion.

As shown in FIGS. 10 and 11, the wheel-side support portion 42 has a pair of vertical plate portions 42a, which are separately arranged on front and rear sides of an end portion 40a of the lateral link 40, a joint plate portion 42b, which joins lateral end portions of the pair of vertical plate portions 42a to each other, and an upper plate portion 42c, which is abutted against upper ends of the pair of vertical plate portions 42a from above and receive a cushion material 51 of a stopper member 50.

The pair of vertical plate portions 42a are fixed to the wheel support member 11 by being welded to the placing base portion 11b. The upper plate portion 42c extends from an upper end portion of the joint plate portion 42b, and is supported by the joint plate portion 42b. Specifically, the upper plate portion 42c is constituted by a bent end portion provided at an upper portion of the joint plate portion 42b. The upper plate portion 42c and the pair of vertical plate portions 42a are not welded to each other. The upper plate portion 42c is not attached to the pair of vertical plate portions 42a. The pair of vertical plate portions 42a and the joint plate portion 42b are jointed to each other by means of integral molding. A screw shaft member 43, which allows the end portion 40a to be pivotably supported by the pair of vertical plate portions 42a, is inserted into the end portion 40a and the pair of vertical plate portions 42a. The pair of vertical plate portions 42a are fastened by the screw shaft member 43 along and toward the end portion 40a.

In the wheel-side support portion 42, as a result of the end portion 40a being pivotably supported by the pair of vertical plate portions 42a via the screw shaft member 43, and the pair of vertical plate portions 42a being provided along the end portion 40a, the lateral link 40 is supported so as to pivot up and down without loosening relative to the wheel-side support portion 42.

An elastic member 44 is interposed between the lateral link 40 and the vehicle body-side support portion 41. If jamming is about to occur between the lateral link 40 and the vehicle body-side support portion 41, the elastic member 44 is elastically deformed, and the jamming is resolved by this elastic deformation. An elastic member is interposed between the lateral link 40 and the wheel-side support portion 42, similarly to the elastic member between the lateral link 40 and the vehicle body-side support portion 41.

As shown in FIG. 10, the stopper member 50 extends from the vehicle body frame 12 toward the wheel-side support portion 42. The cushion material 51 is provided at a lower end portion of the stopper member 50. When the wheel support member 11 is raised, the cushion material 51 comes into contact with an upper end portion of the wheel-side support portion 42, and a raising limit of the wheel support member 11 is set by the cushion material 51. The wheel-side support portion 42 serves as a limit setting member for setting the raising limit of the rear wheels 2 relative to the vehicle body.

Modifications of First Embodiment (1) Although the above embodiment has described the suspension system 10 employed to support the rear wheels 2, the embodiment may also be employed to support the front wheels.

(2) Although the above embodiment has described an example in which the engine 8 and the transmission 13 are supported by the wheel support member 11, this need not be the case. For example, a configuration may alternatively be employed in which the transmission 13 is supported but the engine 8 is not supported, or in which neither the engine 8 nor the transmission 13 is supported.

(3) Although the above embodiment has described an example in which the left upper link 21 and lower link 22 are formed to have a curved shape, the left upper link 21 and lower link 22 may be formed to have a straight shape if there is no need to avoid contact with apparatus parts.

(4) Although the above embodiment has described an example in which the link mechanisms 20 are provided on the left and right sides, this need not be the case. For example, a configuration may alternatively be employed in which the wheels are supported by only one link mechanism that has a pair of left and right lower links and one upper link provided above the lower links.

Second Embodiment

Hereinafter, the second embodiment of the present invention will be described based on the drawings.

Note that the front-rear direction and the left-right direction in the description of this embodiment are defined as follows, unless otherwise stated. That is to say, in a utility vehicle to which the present invention is applied, "forward/front" refers to a forward traveling direction (see an arrow F in FIGS. 12 and 13) during a work travel of a traveling machine body, "back/rear" refers to a reverse traveling direction (see an arrow B in FIGS. 12 and 13), "right" refers to a direction corresponding to the right side based on a forward orientation in the front-rear direction (see an arrow R in FIG. 13), and "left" refers similarly to a direction corresponding to the left side (see an arrow L in FIG. 13). "Up/upper" refers to an arrow U shown in FIG. 16, and "down/lower" refers to an arrow D shown in FIG. 16.

Overall Configuration

Figure 12:
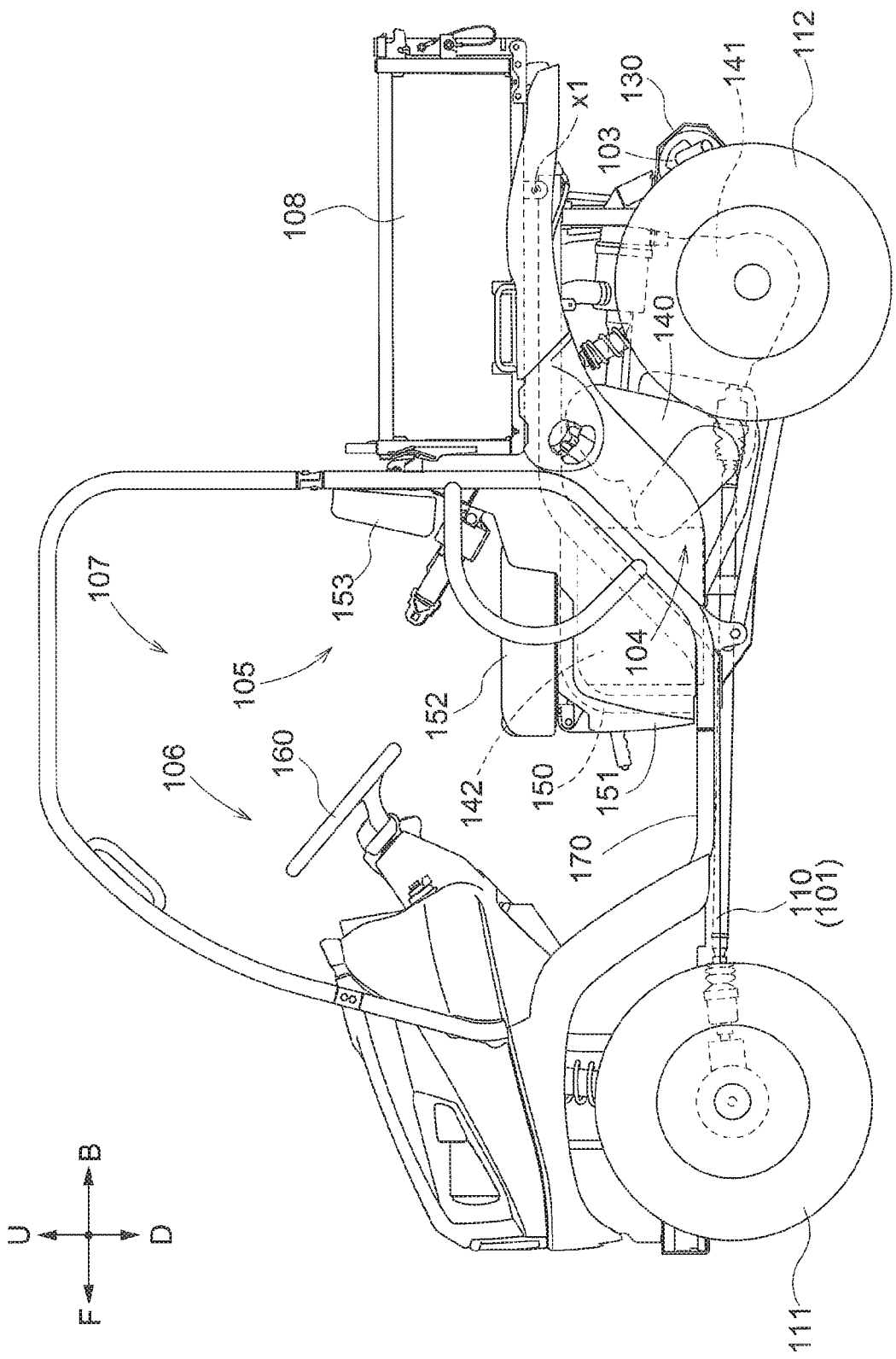
FIG. 12 illustrates a second embodiment (FIGS. 13 to 16 also illustrate the same), and is a left side view that shows a utility vehicle.
Figure 13:
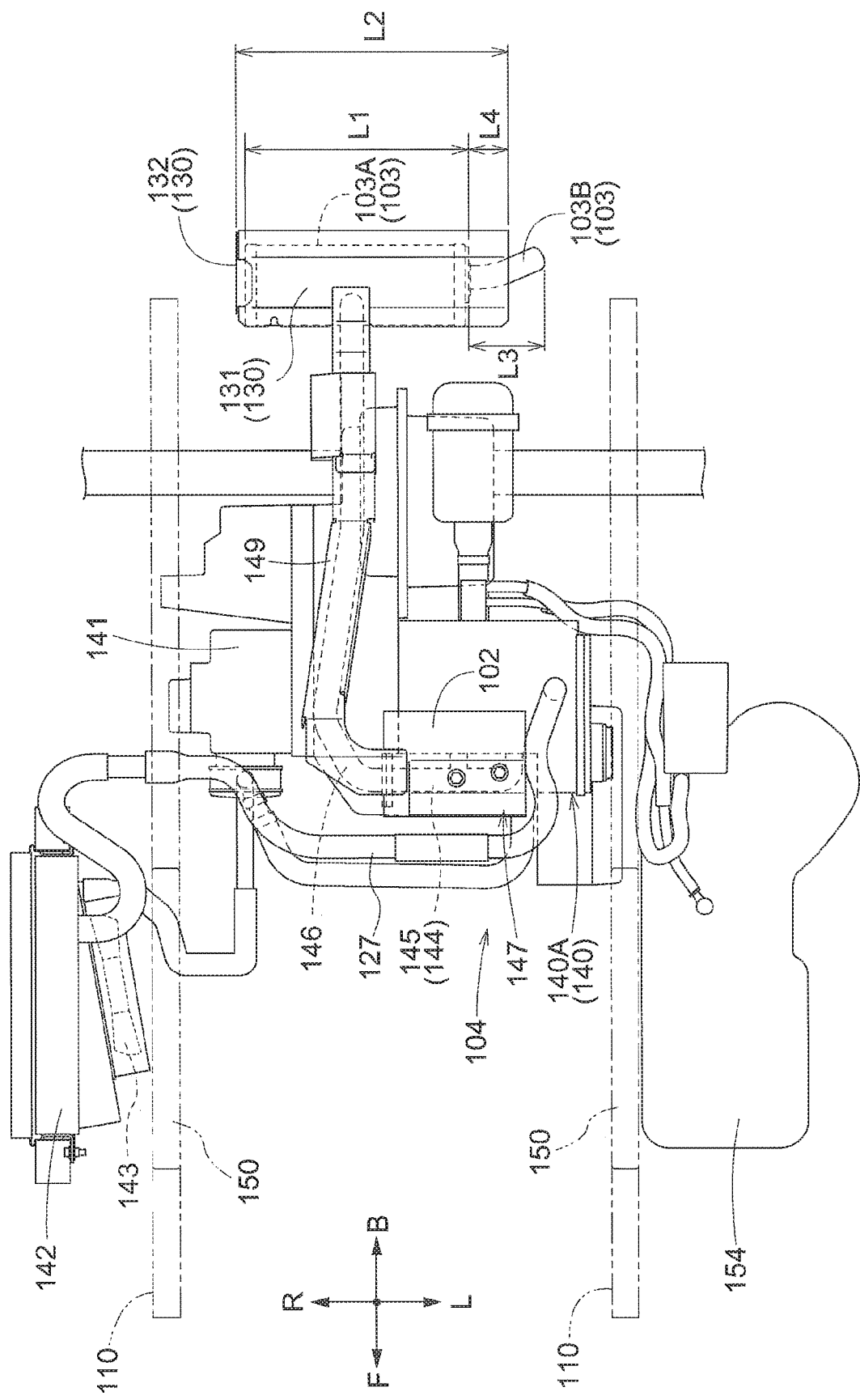
FIG. 13 is a plan view that shows a motive portion.
Figure 14:
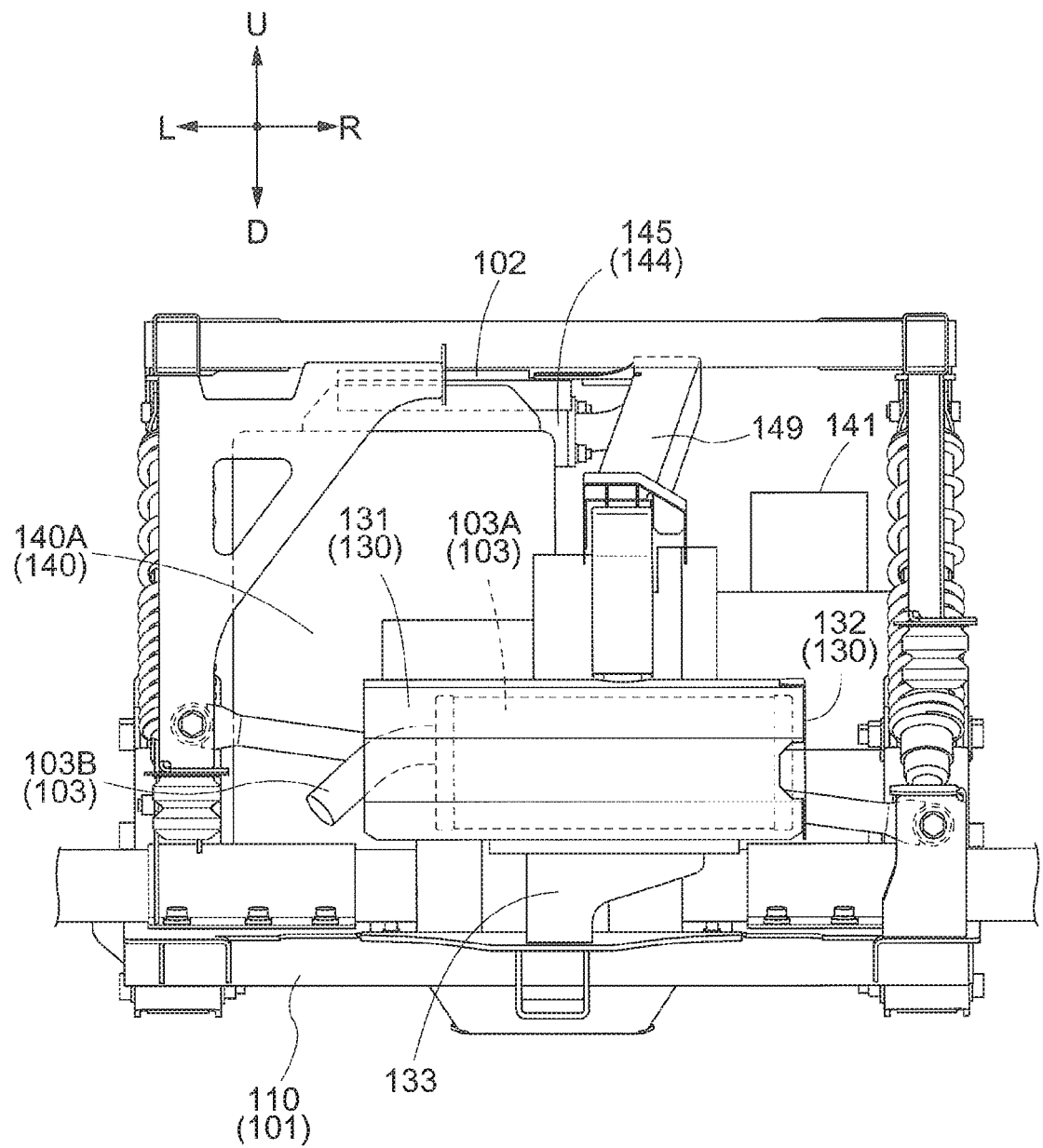
FIG. 14 is a rear view that shows the motive portion.

As shown in FIGS. 12 to 14, front wheels 111, which are constituted by a pair of left and right steerable tire wheels, and rear wheels 112, which are constituted by a pair of left and right tire wheels, are arranged separately on the front and rear sides of a vehicle body frame 101. A motive portion 104, which drives the front wheels 111 and the rear wheels 112, and a driving section 107, which includes a driver's seat 105 and a steering operation portion 106, are provided between the front wheels 111 and the rear wheels 112. A carrier 108 is mounted in a rear portion of the vehicle body frame 101 so as to be able to pivot up and down around a horizontal axis x1, which extends laterally and is located in a vehicle body rear portion. A work vehicle is constituted by a utility vehicle that includes the vehicle body frame 101, the front wheels 111 and rear wheels 112, the motive portion 104, the driving section 107, and the carrier 108.

As shown in FIG. 13, the vehicle body frame 101 is constituted by a main frame 110, which has a pair of left and right square steel pipe materials serving as main materials and is elongated in the front-rear direction, seat support frames 150, which are provided along the left and right main frames 110, a driving section floor 170, which has a flat plate shape, and so on.

Configuration of Driving Section

In the driving section 107, the driving section floor 170 is provided on the left and right main frames 110, the steering operation portion 106 with a steering wheel 160 is arranged in front of the driving section floor 170, and the driver's seat 105 is arranged in the rear of driving section floor 170.

The driver's seat 105 includes a shielding wall 151, which expands over front faces and upper faces of the seat support frames 150 that stands on the left and right main frames 110. A sitting seat 152 is installed on the upper side of an upper face portion of the shielding wall 151, and a back seat 153 is fixed to a raised portion on the rear side of the seat support frame 150.

As shown in FIGS. 12 and 13, a radiator 142 is arranged in a state of being hidden in a space below the seat support frames 150 at a position near a right lateral side portion of the space below the seat support frames 150 of the driver's seat 105. A fuel tank 154 is arranged at a position near a left lateral side portion of the space below the seat support frames 150. A configuration is employed in which outside air can be introduced from the lower side and the rear side of the seat support frames 150 due to a suctioning effect of a radiator fan 143, which is arranged on the back side (machine body inner side) of the radiator 142.

Configuration of Motive Portion

The motive portion 104 is arranged in a lower portion behind the driver's seat 105, and a water-cooled engine 140 and a transmission case 141 are separately arranged on the left and right sides. Accordingly, the length of the motive portion 104 in the front-rear direction is shorter than that in the case where the water-cooled engine 140 and the transmission case 141 are arranged in the front-rear direction. The output from the transmission case 141 is transmitted to the left and right rear wheels 112 and front wheels 111.

In the motive portion 104, the water-cooled engine 140 is located on the left side in an laterally-placed orientation in which the axis direction of crankshafts of the water-cooled engine 140 is parallel to the machine body left-right direction, the transmission case 141 is located on the right side, and thus the water-cooled engine 140 and the transmission case 141 are arranged side-by-side on the left and right sides. Furthermore, the water-cooled engine 140 and the transmission case 141 are arranged on the machine body rear side within a gap width in the left-right direction between the fuel tank 154 and the radiator 142 in a plan view.

That is to say, as shown in FIG. 13, the engine 140 and the transmission case 141 are arranged in a state where their positions are shifted from each other in both the front-rear direction and the left-right direction in a plan view, relative to the fuel tank 154 and the radiator 142, and thus, the entire motive portion 104 is designed such that the size thereof in the front-rear direction is shortened.

Figure 15:
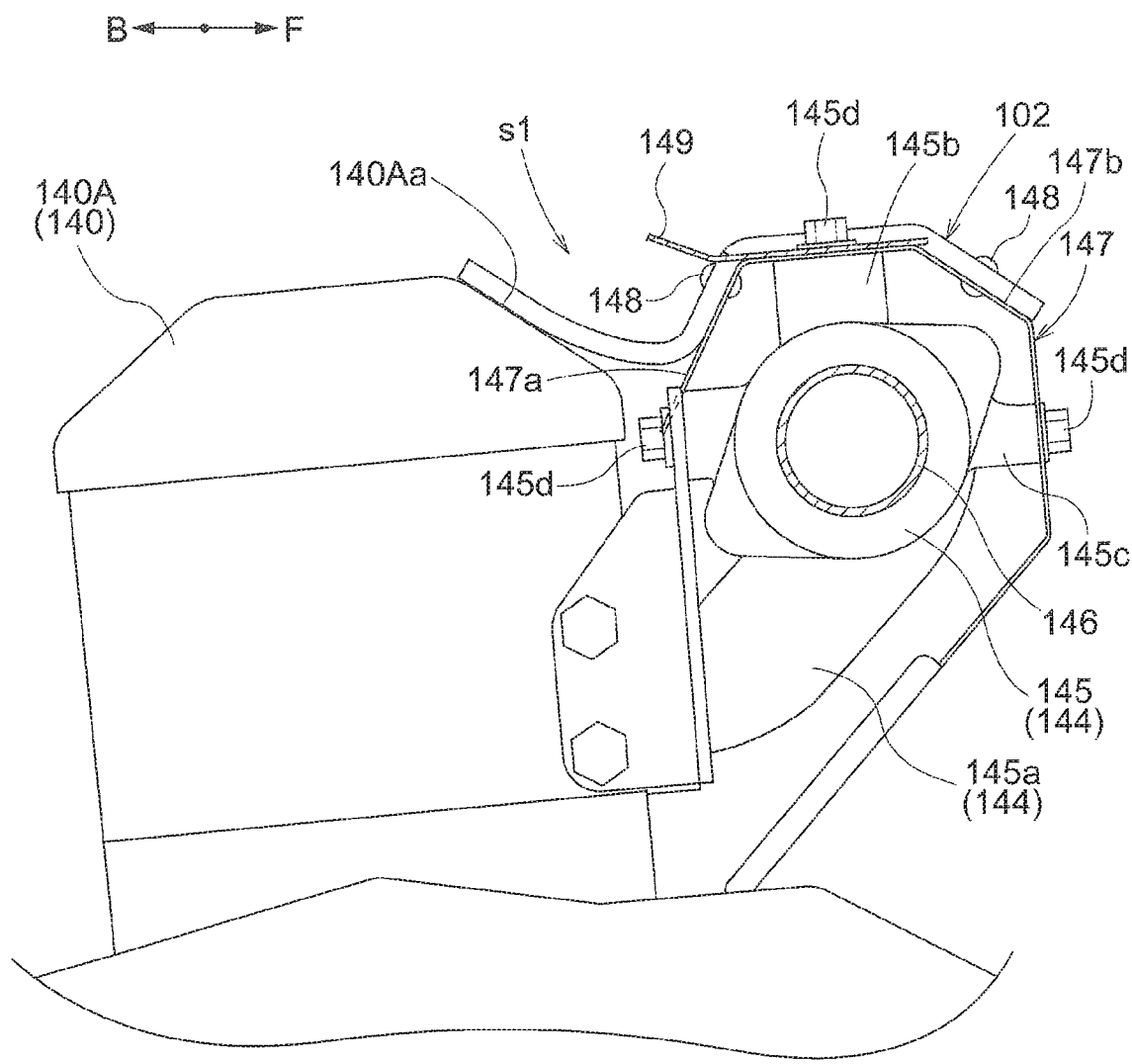
FIG. 15 is a right side view that shows a heat-insulating cover that spans between an engine body and an exhaust manifold cover.

As shown in FIGS. 13 and 15, the engine 140 includes an exhaust manifold 144, which is adjacent to a lateral side portion of an area corresponding to cylinders (not shown) on the upper front side of an engine body 140A.

This exhaust manifold 144 includes one cylindrical collecting pipe portion 145, which includes a plurality of exhaust paths 145a (which correspond to passages) that are continuous with the respective cylinders in the engine body 140A. The cylindrical collecting pipe portion 145 is arranged in a lateral orientation in which the cylinder axis direction is parallel to the horizontal direction, and is provided in a state of protruding from a side portion of the engine body 140A in an area adjacent to an upper portion of the engine body 140A.

An exhaust duct 146 for leading exhaust gas toward a muffler 103 is provided continuously with the collecting pipe portion 145. This exhaust duct 146 extends toward the machine body rear side while passing between the upper portion of the transmission case 141 and carrier 108, and is connected to the muffler 103.

The muffler 103 is located at a machine body rear end portion on the rear side of the transmission case 141, and is provided at a low position on the vehicle body frame 101.

Exhaust Manifold Cover

Figure 16:
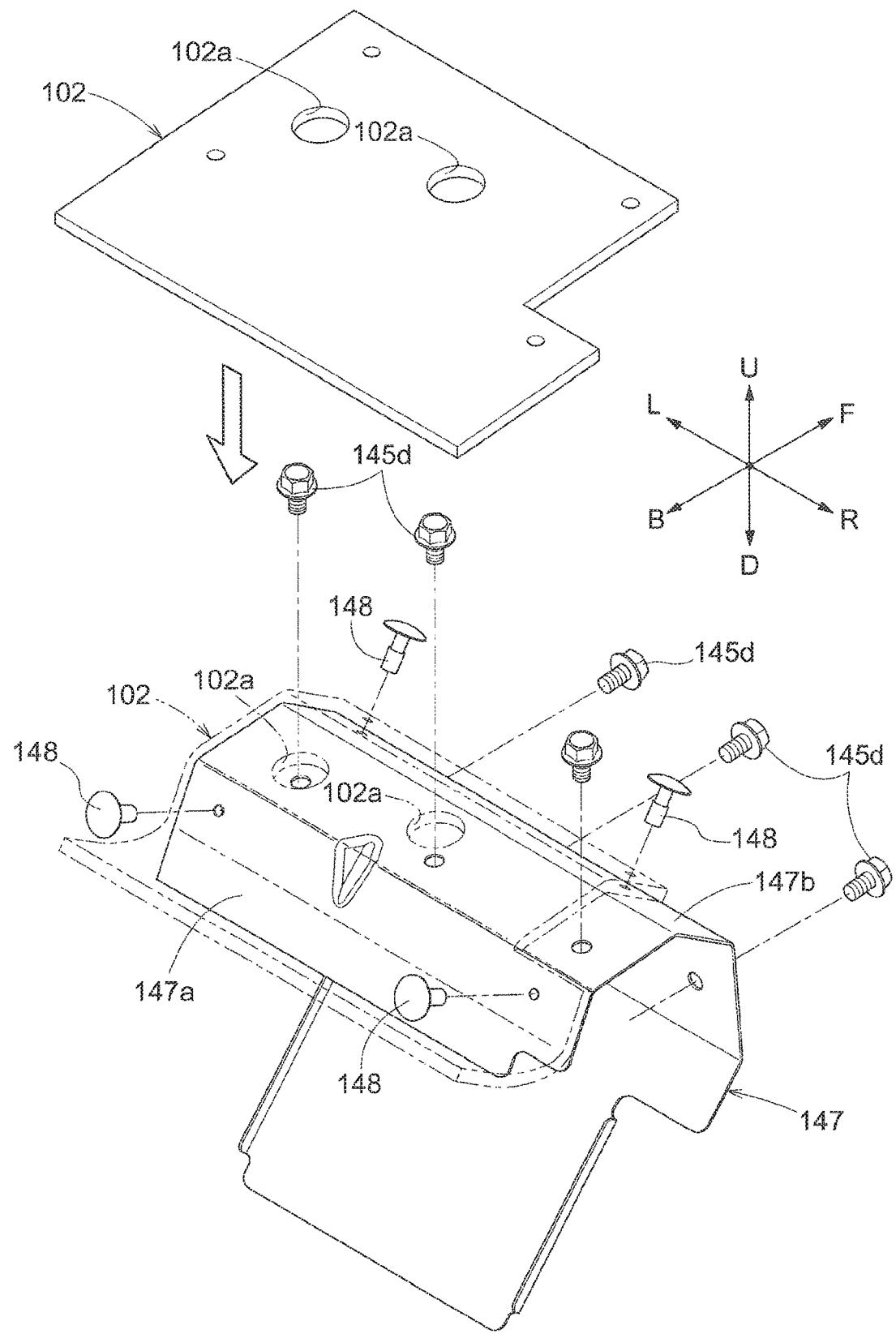
FIG. 16 is an exploded perspective view that shows the exhaust manifold cover and the heat-insulating cover.

As shown in FIGS. 15 and 16, an outer-circumferential portion of the collecting pipe portion 145 of the exhaust manifold 144 is covered by an exhaust manifold cover 147, which is made of a sheet metal.

That is to say, the exhaust manifold cover 147 is formed to have a shape that covers the outer periphery of the cylindrical collecting pipe portion 145. This exhaust manifold cover 147 is joined and fixed to the collecting pipe portion 145 via joint bolts 145*d* at an upper attachment portion 145*b*, which protrudes upward at an outer-circumferential portion of the collecting pipe portion 145, and a side attachment portion 145*c*, which protrudes toward a side away from the engine body 140A.

An upper face of the exhaust manifold cover 147 is provided with a rearward inclined face 147*a*, which is lowered as it approaches the engine body 140A. A forward inclined face 140Aa, which is lowered as it approaches the exhaust manifold 144, is formed in an upper face of the engine body 140A. Accordingly, a V-shaped recessed space area sl is formed by the rearward inclined face 147*a* of the exhaust manifold cover 147 and the forward inclined face 140Aa of the engine body 140A, as shown in FIG. 15.

Heat-Insulating Cover

A plate-shaped heat-insulating cover 102, which is made of a flexible heat-insulating material, is provided at a position spanning between the upper portion of the engine body 140A and the exhaust manifold cover 147. This heat-insulating cover 102 is configured by covering glass wool with an aluminum sheet, for example.

As shown in FIGS. 15 and 16, the thus-configured heat-insulating cover 102 is arranged in a state of being bent into a shape that follows the upper face of the engine body 140A and the upper face of the exhaust manifold cover 147.

That is to say, the heat-insulating cover 102 is provided in a state of being bent into a V shape along two inclined faces 147*a* and 140Aa, namely the rearward inclined face 147*a* formed in the upper face of the exhaust manifold cover 147 and the forward inclined face 140Aa of the engine body 140A.

The heat-insulating cover 102 is provided in a state of being fixed at its portion opposing the exhaust manifold cover 147 to the exhaust manifold cover 147, and in contact, at its portion opposing the engine 140A, with the engine body 140A.

The position at which the heat-insulating cover 102 is attached to the exhaust manifold cover 147 is a position different from an area where the upper attachment portion 145*b* and the side attachment portion 145*c* are present, which are portions at which the collecting pipe portion 145 and the exhaust manifold cover 147 are joined to each other. That is to say, the heat-insulating cover 102 is fixed, via rivets 148, to the rearward inclined face 147*a* formed in the upper face of the exhaust manifold cover 147, and an inclined face 147*b* located on the front side, which is the side opposite to the rearward inclined face 147*a*.

The rivets 148 are provided in inclination of the rearward inclined face 147*a* and the inclined face 147*b* located on the front side, and head portions of the rivets 148 are riveted and are thus necessarily rounded to have a shape with which weeds or the like is unlikely to be caught on the rivets 148. At the same time, if the rivets 148 are used, the amount by which the head portions protrude toward the upper face side of the heat-insulating cover 102 is smaller than that in the case of using bolts. In this regard as well, there is little concern that weeds or the like that is slipping along the inclined faces 147*a* and 147*b* will be caught and jammed.

As shown in FIGS. 15 and 16, open holes 102*a*, into which head portions of the joint bolts 145*d* can be inserted, are formed in a part of the heat-insulating cover 102 that opposes the area in which the exhaust manifold cover 147 is joined with bolts to the upper attachment portion 145*b* on the upper face side of the exhaust manifold cover 147.

Accordingly, in a state where the heat-insulating cover 102 is attached to the exhaust manifold cover 147, the head portions and therearound of the joint bolts 145*d* are in a state of being surrounded by the open holes 102*a*. Due to this configuration, the amount by which the head portions of the joint bolts 145*d* protrude from the upper face of the heat-insulating cover 102 can be reduced, and thus, concern that weeds or the like will be caught on the head portions of the joint bolts 145*d* can be reduced.

A portion of the heat-insulating cover 102 that opposes the engine body 140A is not joined and fixed to the engine body 140A, but is provided in a state of being in contact with the upper portion of the engine body 140A.

In this regard, the heat-insulating cover 102 is bent into a V shape along two inclined faces 147*a* and 140Aa, namely the rearward inclined face 147*a* of the exhaust manifold cover 147 and the forward inclined face 140Aa of the engine body 140A, and is fixed in this state, in a state of being cantilevered by the exhaust manifold cover 147.

Accordingly, the weight of the heat-insulating cover 102 itself and a drag that occurs when the heat-insulating cover 102 receives an external force in a bending direction to be bent into a V shape occur, at a portion of the heat-insulating cover 102 that is in contact with the upper portion of the engine body 140A. Due to the weight of the heat-insulating cover 102 itself and the drag against the bending, the portion of the heat-insulating cover 102 that is in contact with the upper portion of the engine body 140A enters a state of being pressed against the forward inclined face 140Aa of the engine body 140A.

Then, the pressed portion of the heat-insulating cover 102 is restrained from moving in a direction away from the frontward inclined face 140Aa of the engine body 140A, and the possibility that weeds or the like will enter from the portion at which the heat-insulating cover 102 is in contact with the forward inclined face 140Aa of the engine body 140A may be reduced.

In addition, due to the heat-insulating cover 102 being not joined to the upper portion of the engine body 140A, vibrations occurring on the exhaust manifold cover 147 side can also be avoided from being transmitted to the upper portion of the engine body 140A.

As shown in FIGS. 13 and 14, one end side of a duct cover 149, which covers the upper side of the exhaust duct 146, is joined to the exhaust manifold cover 147. The other end side of the duct cover 149 is joined to a muffler cover 130, which covers the surroundings of the muffler 103.

Muffler Cover

As shown in FIGS. 13 to 15, a main body 103A of the muffler 103 that has a muffler chamber, which is formed to have a cylindrical shape, is arranged in a laterally fallen orientation in which the axis direction is parallel to the left-right direction, and an exhaust pipe 103B protrudes laterally outward from the one end side of the main body 103A.

The muffler cover 130 includes an outer-circumferential cover portion 131, which covers an upper portion and a rear portion of the muffler 103, and a lateral cover portion 132, which opposes an end portion of the main body 103A on the side opposite to the side on which the exhaust pipe 103B protrudes, and the muffler cover 130 is open on the side on which the exhaust pipe 103B protrudes.

A lower end portion of the outer-circumferential cover portion 131 is joined and fixed to the vehicle body frame 101 via an attachment bracket 133.

As shown in FIG. 13, the muffler cover 130 has the length L2 in the left-right direction that is larger than the length L1 of the main body 103A in the left-right direction. The exhaust pipe 103B protrudes from an end portion of the main body 103A toward the one end side by the protruding length L3.

The length of the muffler cover 130 is set such that the muffler cover 130 covers the entire main body 103A in the left-right direction and a portion of the protruding length L3 of the exhaust pipe 103B. Of the protruding length L3 of the exhaust pipe 103B, the length L4 of the portion covered by the muffler cover 130 is desirably half the protruding length L3 or more.

A portion of the protruding length L3 of the exhaust pipe 103B is thus covered by the muffler cover 130 in order to readily avoid straw coming into direct contact with the main body 103A and the exhaust pipe 103B of the muffler 103 in the case where, when the traveling machine body is reversed, the muffler cover 130 located at a rear end portion collides with a bale of straw.

Modifications of Second Embodiment (1) In the above embodiment, the engine 140 is laterally arranged with the axis direction of its crankshaft coinciding with the machine body left-right direction, but may alternatively be vertically arranged with the axis direction of the crankshaft coinciding with the machine body front-rear direction.

(2) In the above embodiment, an exhaust manifold cover that includes a cylindrical collecting pipe portion 145 connected to a plurality of exhaust paths 145*a* leading to respective cylinders in the engine body 140A has been described as an example of the exhaust manifold 144. However, the structure of the exhaust manifold cover 147 is not necessarily limited to this structure. For example, in a structure in which a plurality of exhaust paths 145*a* are simply provided, the exhaust manifold cover 147 may be configured to cover the plurality of exhaust paths 145*a*.

Third Embodiment

Hereinafter, the third embodiment of the present invention will be described based on the drawings.

Note that the front-rear direction and the left-right direction in the description of this embodiment are defined as follows, unless otherwise stated. That is to say, in a utility vehicle, which is an example of a work vehicle to which the present invention is applied, "forward/front" refers to a forward traveling direction (see an arrow F in FIGS. 17 and 18) during a work travel of a traveling machine body, "back/rear" refers to a reverse traveling direction (see an arrow B in FIGS. 17 and 18), "right" refers to a direction corresponding to the right side based on a forward orientation in the front-rear direction (see an arrow R in FIG. 18), and "left" refers similarly to a direction corresponding to the left side (see an arrow L in FIG. 18).

Overall Configuration

Figure 17:
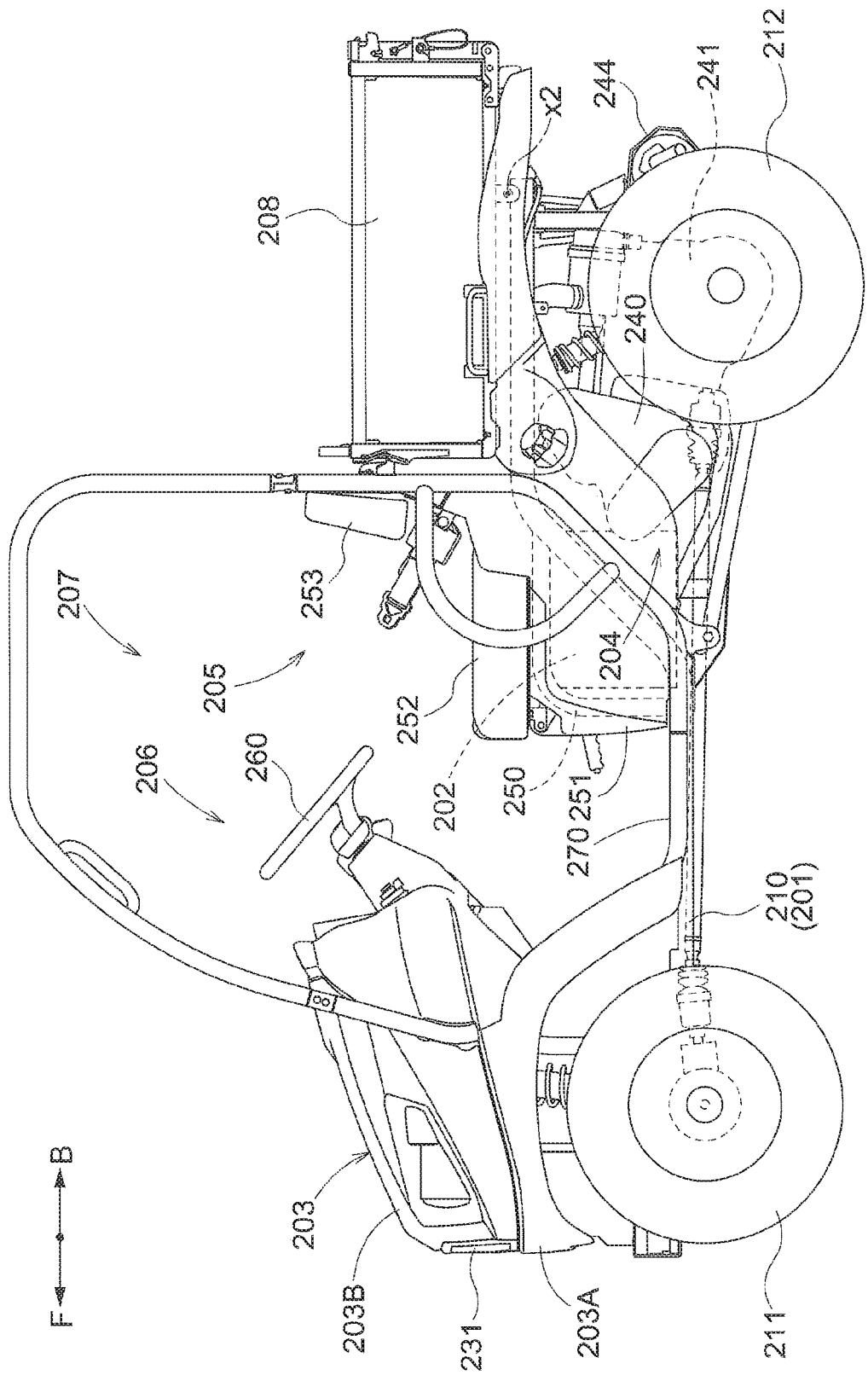
FIG. 17 illustrates a third embodiment (FIGS. 18 to 21 also illustrate the same), and is a left side view of a utility vehicle.

As shown in FIG. 17, front wheels 211, which are constituted by a pair of left and right steerable tire wheels, and rear wheels 212, which are constituted by a pair of left and right tire wheels, are separately arranged on the front and rear sides of a vehicle body frame 201. A motive portion 204, which drives the front wheels 211 and the rear wheels 212, and a driving section 207, which includes a driver's seat 205, a steering operation portion 206, and a hood 203, are provided between the front wheels 211 and the rear wheels 212.

A carrier 208 is mounted in a rear portion of the vehicle body frame 201 so as to be able to pivot up and down around a horizontal axis x2, which extends laterally and located in a vehicle body rear portion. A work vehicle is constituted by a utility vehicle that includes the vehicle body frame 201, the front wheels 211 and rear wheels 212, the motive portion 204, the driving section 207, and the carrier 208.

Figure 18:
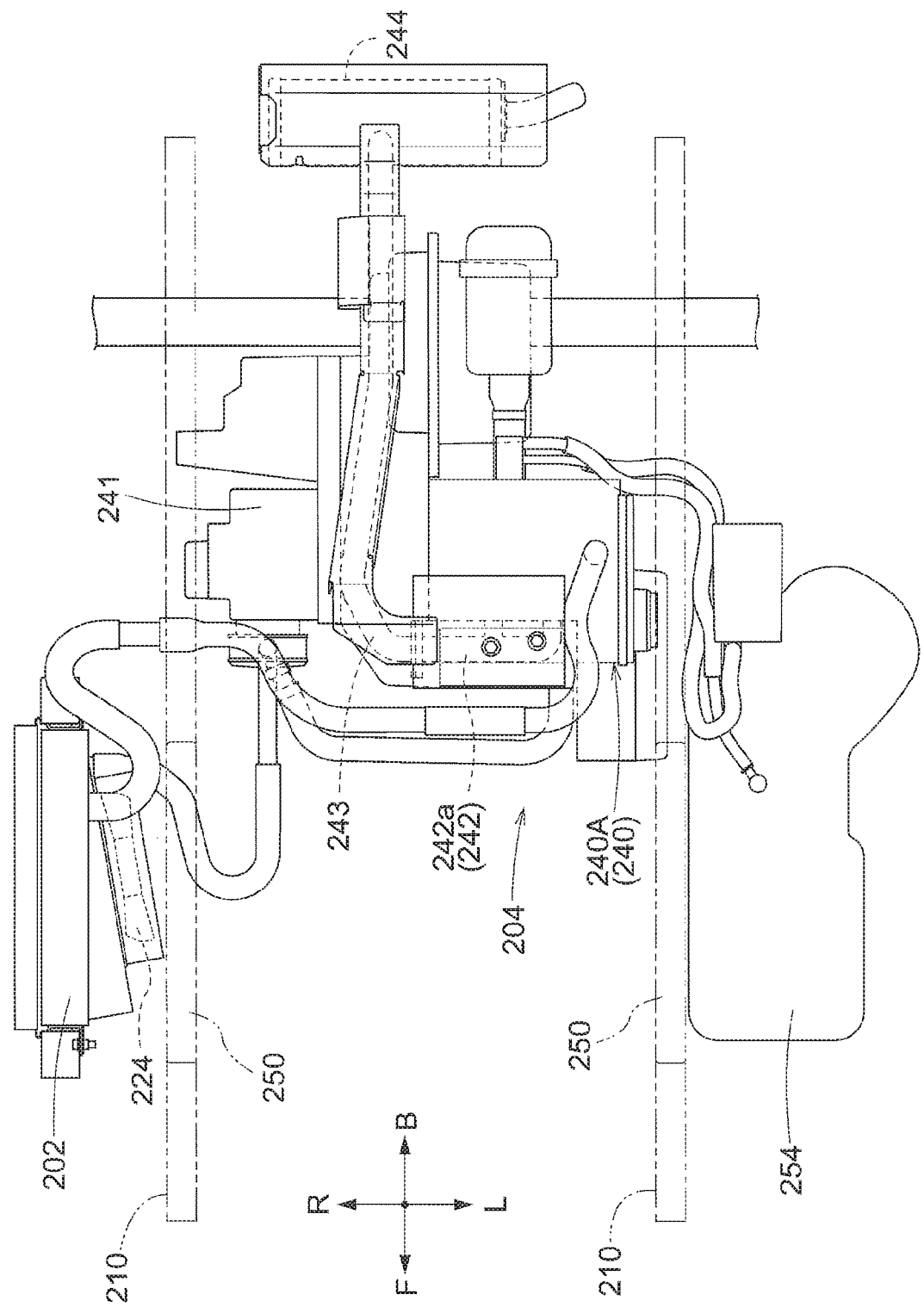
FIG. 18 is a plan view that shows a motive portion.

As shown in FIG. 18, the vehicle body frame 201 is constituted by a main frame 210, which has a pair of left and right square steel pipe materials serving as main materials and is elongated in the front-rear direction, seat support frames 250, which are provided on the left and right main frames 210, a driving section floor 270, which has a flat plate shape, and so on.

Configuration of Driving Section

In the driving section 207, the driving section floor 270 is provided on the left and right main frames 210, the steering operation portion 206 with a steering wheel 260 is arranged in front of the driving section floor 270, and the driver's seat 205 is provided in the rear of driving section floor 270.

The driver's seat 205 includes a sitting seat 252 and a back seat 253. The seat support frames 250 are provided, standing on the left and right main frames 210. A shielding wall 251 is provided, spanning between front faces and upper faces of the seat support frames 250.

The sitting seat 252 is installed on the upper side of the upper face portion of the shielding wall 251, and the back seat 253 is fixed to the rear side of the seat support frames 250.

As shown in FIGS. 17 and 18, a radiator 202 is arranged in a state of being hidden in a space below the seat support frames 250, at a position near a right lateral side portion of the space below the seat support frames 250 of the driver's seat 205. A fuel tank 254 is arranged at a position near a left lateral side portion of the space below the seat support frames 250. A configuration is employed in which outside air can be introduced from the lower side and the laterally outer side of the seat support frames 250 due to a suctioning effect of a radiator fan 224, which is arranged on the back side (machine body inner side) of the radiator 202.

Configuration of Motive Portion

The motive portion 204 is provided at a lower portion behind the driver's seat 205. In the motive portion 204, a water-cooled engine 240 and a transmission case 241 are separately arranged on the left and right sides. Accordingly, the length of the motive portion 204 in the front-rear direction is shorter than that in the case where the water-cooled engine 240 and the transmission case 241 are arranged in the front-rear direction. The output from the transmission case 241 is transmitted to the left and right rear wheels 212 and front wheels 211.

In the motive portion 204, the water-cooled engine 240 is located on the left side in an laterally-placed orientation in which the axis direction of crankshafts of the water-cooled engine 240 is parallel to the machine body left-right direction, the transmission case 241 is located on the right side, and thus the water-cooled engine 240 and the transmission case 241 are arranged side-by-side on the left and right sides. Furthermore, the water-cooled engine 240 and the transmission case 241 are arranged on the machine body rear side within a gap width in the left-right direction between the fuel tank 254 and the radiator 202 in a plan view.

That is to say, as shown in FIG. 18, the engine 240 and the transmission case 241 are arranged in a state where their positions are shifted from each other in both the front-rear direction and the left-right direction in a plan view, relative to the fuel tank 254 and the radiator 202, and thus, the entire motive portion 204 is designed such that the size thereof in the front-rear direction is shortened.

The engine 240 includes an exhaust manifold 242, which is adjacent to a lateral side portion of an area corresponding to cylinders (not shown) on the upper front side of an engine body 240A.

This exhaust manifold 242 includes one cylindrical collecting pipe portion 242a, which includes a plurality of exhaust paths (not shown) that are continuous with respective cylinders in the engine body 240A. The cylindrical collecting pipe portion 204a is arranged in a lateral orientation with the cylinder axis direction parallel to the horizontal direction, and is provided in a state of protruding from a side portion of the engine body 240A in an area adjacent to an upper portion of the engine body 240A.

An exhaust duct 243 for leading exhaust gas toward a muffler 244 is provided continuously with the collecting pipe portion 242a.

Hood

A hood 203 is provided at a front end portion of the vehicle body frame 201.

Figure 19:
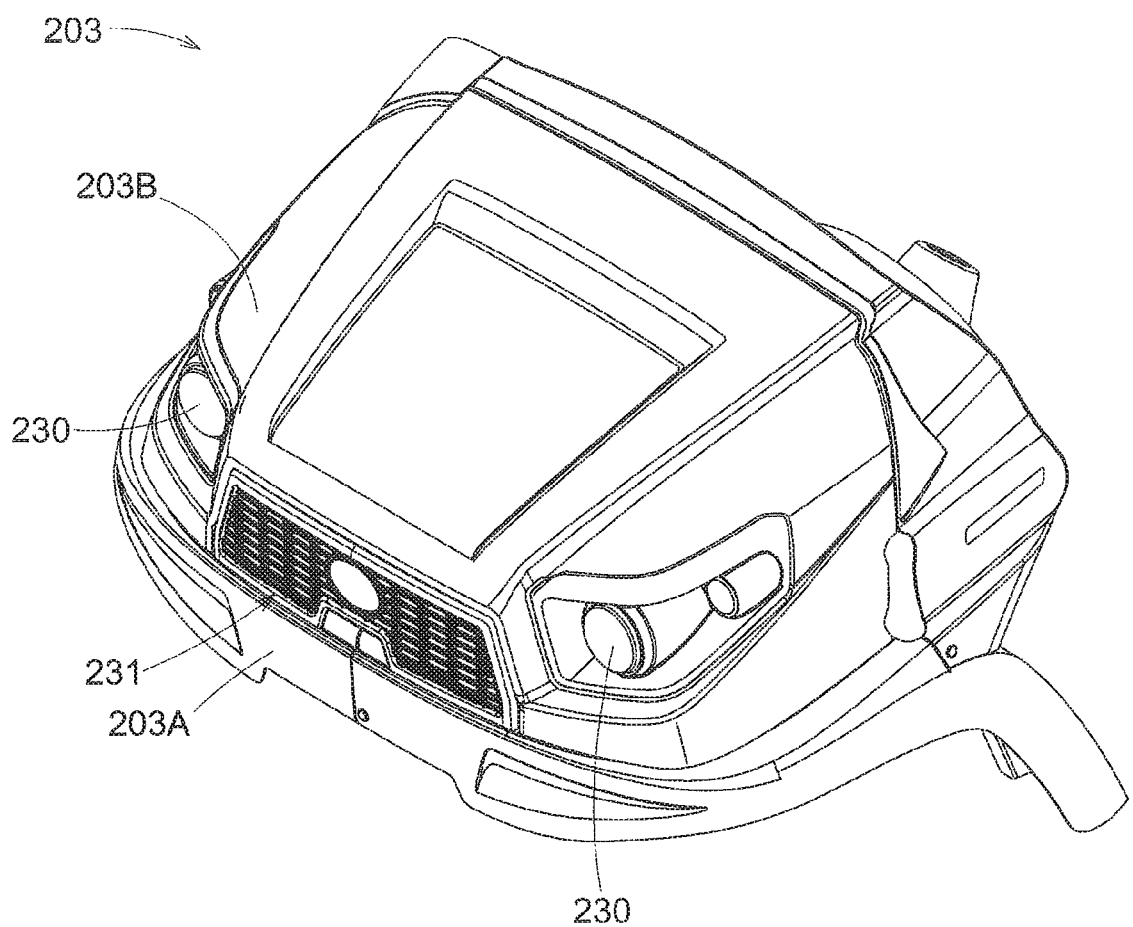
FIG. 19 is a perspective view that shows a hood part.

As shown in FIGS. 17 and 19, the hood 203 includes a lower hood 203A, which is fixed to the vehicle body frame 201, and an upper hood 203B, which is supported on its rear end side by the lower hood 203A to pivot around a lateral axis (not shown), and is attached on its front end side so as to be able to pivot and open upward.

A pair of left and right head lamps 230 are provided at left and right ends of the upper hood 203B, a front grill 231 is provided at a front end portion of the upper hood 203B, and the head lamps 230 and the front grill 231 are attached so as to be able to integrally pivot up and down as the upper hood 203B pivots.

Front Grill

Figure 20:
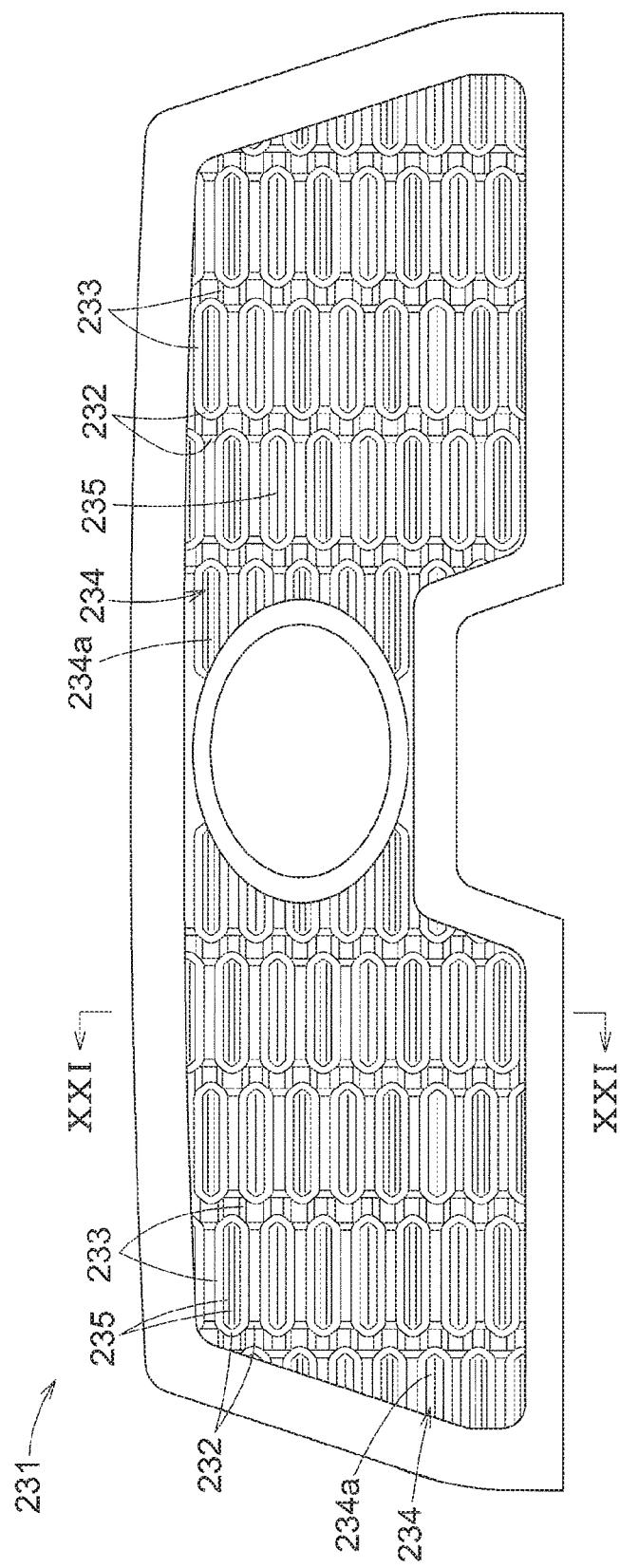
FIG. 20 is a front view that shows a front grill.

As shown in FIG. 20, the front grill 231 is arranged in a state where a large number of vertical bridges 232 (which correspond to bridge members) and a large number of lateral bridges 233 (which correspond to bridge members) intersect each other and form a lattice shape in a front view thereof.

Recessed portions 234, which are recessed toward the back side, are formed at intersecting portions between the vertical bridges 232 and the lateral bridges 233. The recessed portions 234 are formed in areas where ventilation is not needed. That is to say, equipment or the like that needs to be cooled, such as the engine 240 and the radiator 202, is not arranged within the hood 203, and only a suspension mechanism (not shown) for the front wheels 211 or the like is mounted, and therefore, ventilation is not needed.

For this reason, a front grill with recessed portions 234 that do not have ventilation openings or the like is employed as the front grill 231.

Figure 21:
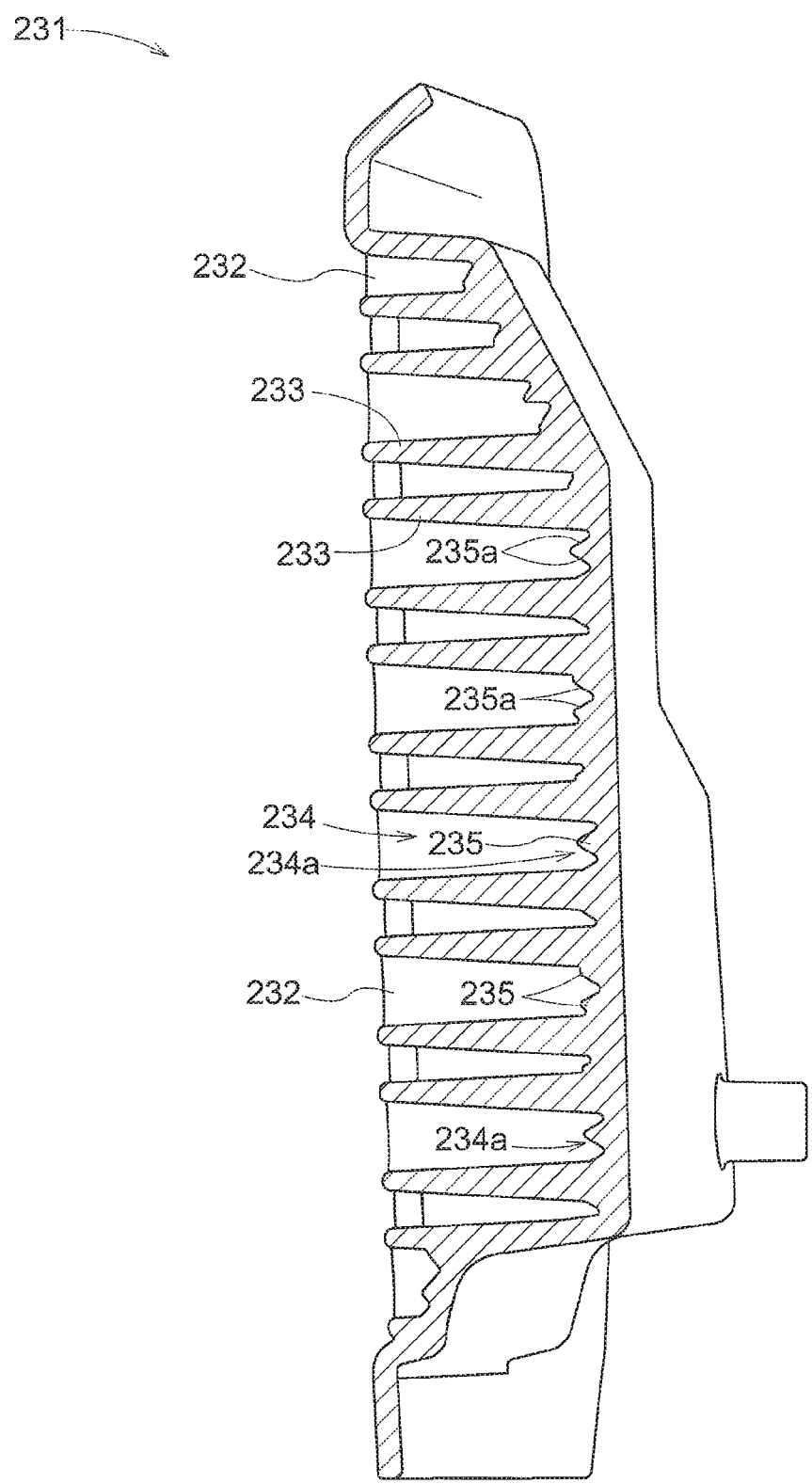
FIG. 21 is a cross-sectional view of FIG. 20 taken along a line XXI-XXI.

As shown in FIG. 21, the inner distal side of each of the recessed portions 234 is closed by a bottom face portion 234a. Naturally, the bottom face portion 234a is located at an inner distal portion on the back side relative to a front end edge (which corresponds to an end edge on the front side) of the vertical bridges 232 and the lateral bridges 233.

Also, small protruding portions 235, which protrude toward the front side (forward) relative to the most distal portions of the bottom face portion 234a, are formed in the bottom face portion 234a.

The small protruding portions 235 are formed into laterally elongated protrusions along the longitudinal direction of the lateral bridges 233 of each recessed portion 234 with a laterally elongated shape, and are formed in two areas above and below the bottom face portion 234a of the recessed portion 234. Each of the small protruding portions 235 has an angular cross-sectional shape that narrows toward the front (forward), and has inclined faces 235a on the upper and lower sides that incline relative to incident light from the front side.

Accordingly, light incident on each of the recessed portions 234 from the front side comes into contact with the inclined faces 235a of the small protruding portion 235 at the inner distal portion, and is scattered in directions different from the incident direction. Thus, the amount of reflected light is considerably smaller on the inner distal side of each of the recessed portions 234 in a front view than that in the case where a simply flat plate is provided, and the front grill 231 is likely to be recognized as having a shape with a depth.

Modifications of Third Embodiment (1) The above embodiment has described an example of the structure of the small protruding portions 235 each of which is formed into a laterally elongated protrusion along the longitudinal direction of the lateral bridges 233 of the recessed portion 234 with a laterally elongated shape, but this need not necessarily be the case. For example, the recessed portions 234 with a laterally elongated shape may alternatively be formed along a direction parallel to the vertical bridges 232, or an oblique direction relative to the vertical bridges 232 and the lateral bridges 233.

Other configurations may be the same as those in the above-described embodiment.

(2) Although the above embodiment has described, as the shape of the small protruding portions 235, a shape with an angular cross-sectional shape that narrows toward the front side (forward), this need not necessarily be the case. For example, the small protruding portions 235 may alternatively be protrusions with a curved cross-section, or may be constituted by a large number of hemispherical or spherical protrusions, or may have a shape with a completely irregular, uneven cross-section.

Other configurations may be the same as those in the above-described embodiment.

(3) The above embodiment has described an example of the structure in which the recessed portions 234 that are closed by the bottom face portions 234a are provided in the front grill 231, which is for a hood 203 within which equipment or the like that needs to be cooled, such as the engine 240 and the radiator 202, is not arranged and no ventilation is needed at all, but this needs not necessarily be the case. For example, even in the case where heat sources that need to be cooled, such as the engine 240, the radiator 202, or a battery, are provided within the hood 203, the recessed portions 234 can be applied to areas through which a large amount of cooling air does not need to pass.

Other configurations may be the same as those in the above-described embodiment.

INDUSTRIAL APPLICABILITY

The present invention is applicable to not only a multipurpose work vehicle, but also various work vehicles such as a rice transplanter and a tractor.

Also, the present invention is applicable not only to a utility vehicle, but also to various work vehicles such as a lawn mower, a truck, or an agricultural work machine.

Also, the present invention is applicable not only to a front grill of a utility vehicle, but also to front grills of various work vehicles such as a lawn mower, a truck, and an agricultural work machine.

DESCRIPTION OF REFERENCE SIGNS

First Embodiment

1 Traveling wheel (rear wheel)
11 Wheel support member
20 Link mechanism
21 Upper link
22 Lower link
23 Link support portion
29 Elastic member
30 Suspension mechanism
33 Suspension support portion
40 Lateral link
40a End portion
41 Vehicle body-side support portion
42 Wheel-side support portion
42a Vertical plate portion
42b Joint plate portion
42c Upper plate portion
43 Screw shaft member
51 Cushion material
P1 Upper pivot axis
P2 Upper joint axis
P3 Lower pivot axis
P4 Lower joint axis
DL Distance (between lower pivot axis and lower joint axis)
FD Gap width (gap width between upper pivot axis and lower pivot axis)
RD Gap width (gap width between upper joint axis and lower joint axis)
UL Distance (between upper pivot axis and upper joint axis)

Second Embodiment

101 Vehicle body frame
102 Heat-insulating cover
102a Open hole
140 Engine
140A Engine body
144 Exhaust manifold
145 Collecting pipe portion
145a Path
145d Joint bolt
147 Exhaust manifold cover
147a Inclined face
148 Rivet Third Embodiment 232, 233 Bridge member
234 Recessed portion
234a Bottom face portion
235 Small protruding portion
235a Inclined face

What is claimed is:

1. A work vehicle comprising:
a wheel support member configured to support a pair of left and right traveling wheels;
a link mechanism configured to support the wheel support member such that the wheel support member can be raised and lowered, the link mechanism being provided spanning between a vehicle body and the wheel support member;
a suspension mechanism configured to elastically support the wheel support member, the suspension mechanism being provided spanning between a suspension support portion, which is formed on the vehicle body, and the wheel support member; and
a lateral link configured to restrict leftward and rightward movement of the wheel support member, the lateral link being joined to a vehicle body-side support portion, which is formed on the vehicle body, and to a wheel-side support portion, which is formed on the wheel support member,
wherein:
the link mechanism has: an upper link with a front end portion supported so as to be able to pivot up and down around an upper pivot axis by a link support portion, which is formed on the vehicle body, and with a rear end portion joined so as to be able to relatively pivot around an upper joint axis by the wheel support member; and a lower link with a front end portion supported so as to be able to pivot up and down around a lower pivot axis by the link support portion, and with a rear end portion joined to the wheel support member so as to be able to relatively pivot around a lower joint axis,
a distance between the upper pivot axis and the upper joint axis is set shorter than a distance between the lower pivot axis and the lower joint axis,
a gap width between the upper joint axis and the lower joint axis is set larger than a gap width between the upper pivot axis and the lower pivot axis,
when the vehicle body is in an unloaded state, the lower joint axis is located lower than the lower pivot axis,
the wheel-side support portion protrudes upward from the wheel support member,
the vehicle body is provided with a cushion material that comes into contact with an upper end portion of the wheel-side support portion when the wheel support member is raised,
the wheel-side support portion has: a pair of vertical plate portions arranged separately on a front side and a rear side of an end portion of the lateral link; a joint plate portion configured to join lateral end portions of the pair of vertical plate portions to each other; an upper plate portion configured to receive the cushion material, in a state of being abutted against upper ends of the pair of vertical plate portions from above; and a screw shaft member configured to allow the end portion to be pivotably supported by the pair of vertical plate portions, and fasten the pair of vertical plate portions toward the end portion, the screw shaft member being inserted into the pair of vertical plate portions and the end portion, and the upper plate portion extends from the joint plate portion and is not attached to the pair of vertical plate portions.

2. The work vehicle according to claim 1, wherein the lower pivot axis is located further toward a vehicle body front side than the upper pivot axis.

3. The work vehicle according to claim 1,
wherein the upper link is supported via an elastic member by the link support portion, and
the lower link is supported via an elastic member by the link support portion.

4. The work vehicle according to claim 1,
wherein the upper link is supported via an elastic member by the wheel support member, and
the lower link is supported via an elastic member by the wheel support member.

* * * * *

UNITED STATES PATENT AND TRADEMARK OFFICE
CERTIFICATE OF CORRECTION

| | | |
|---|---|---|
| PATENT NO. | : 11,479,071 B2 | Page 1 of 1 |
| APPLICATION NO. | : 16/708745 | |
| DATED | : October 25, 2022 | |
| INVENTOR(S) | : Masahiro Azuma et al. | |

It is certified that error appears in the above-identified patent and that said Letters Patent is hereby corrected as shown below:

In the Specification

Column 1, Line 8, delete "Mar. 2, 2019," and insert -- Mar. 1, 2019, --

Signed and Sealed this
Fourteenth Day of February, 2023

Katherine Kelly Vidal
*Director of the United States Patent and Trademark Office*